United States Patent [19]

Rozenwaig et al.

[11] 4,437,190
[45] Mar. 13, 1984

[54] DEVICE FOR SWITCHING SIGNALS BY OPTICAL MEANS AND AUTOMATIC SWITCHING UNITS COMPRISING SAID DEVICE

[76] Inventors: Boris Rozenwaig, 17, Place d'Orion, Meudon-La-Foret, France, 92360; Yves J. Robin-Champigneul, 4, Rue Georges Ville, Paris, France, 75116

[21] Appl. No.: 196,083
[22] PCT Filed: Nov. 8, 1979
[86] PCT No.: PCT/FR79/00102
§ 371 Date: Jul. 8, 1980
§ 102(e) Date: Jul. 8, 1980
[87] PCT Pub. No.: WO80/01028
PCT Pub. Date: May 15, 1980
[51] Int. Cl.$^3$ .............................................. H04B 9/00
[52] U.S. Cl. ..................... 455/600; 250/551; 250/578; 455/607; 455/612
[58] Field of Search ............. 455/600, 601, 606, 607, 455/617, 612; 370/1, 3, 4, 74, 98; 250/551, 578

[56] References Cited

U.S. PATENT DOCUMENTS

| | | | |
|---|---|---|---|
| 3,801,819 | 4/1974 | Ohnsorge | 455/601 |
| 4,074,142 | 2/1978 | Jackson | 250/551 |
| 4,229,071 | 10/1980 | d'Auria et al. | 250/578 |
| 4,249,264 | 2/1981 | Crochet et al. | 455/612 |

FOREIGN PATENT DOCUMENTS 2421110 11/1975 Fed. Rep. of Germany .
2295666 12/1974 France .

*Primary Examiner*—Joseph A. Orsino, Jr.
*Attorney, Agent, or Firm*—Lowe, King, Price & Becker

[57] ABSTRACT

The switching device according to the invention is of the type comprising a transmit board having a plurality of optical link emitter elements respectively connected to an equal number of incoming links, a receive board comprising a plurality of optical link elements respectively connected to an equal number of outgoing links and optical means for projecting the image of the emitter board on the receive board, each of the elements of one of the boards being constituted by an array of elementary optical or electro-optical components in a number at least equal to the number of the link elements of the other board and comprising in addition switching means making it possible to connect at least one of these elementary components to the link associated with said element; in such a device, it is necessary, on one hand, to control the switching means by call signals, address signals, etc., . . . and, on the other hand, to guarantee precise geometric relationships with regard to position between the link elements of the one and the other board.

According to the invention, the functions of switching control and positional control of the elements of the links are realized by means of optical or electro-optical supplementary elements fast with one and the other board, which allows to dispense with numerous electrical links and to guarantee a correct functioning of the device.

The device of the invention is suitable in particular for equipping automatic switching units in telecommunication networks.

16 Claims, 26 Drawing Figures

DEVICE FOR SWITCHING SIGNALS BY OPTICAL MEANS AND AUTOMATIC SWITCHING UNITS COMPRISING SAID DEVICE

The invention relates to a device for switching signals by optical means and to automatic switching units comprising said device.

The devices for signal switching by optical means allow, in principle, the very rapid switching of signals conveyed, over at least one link of a plurality (N) of input channels, towards at least one link of a plurality (P) of outgoing channels. The switched signals may have a very wide pass-band if they are analog signals and a very high throughput rate if they are numerical i.e., digital signals. The automatic switching units comprising these devices are therefore particularly suitable for the transmission of information signals of very wide passband, such as signals representing images in motion.

There has already been proposed, for example in U.S. Pat. No. 4,074,142, a device for switching signals by optical means. The prior art device includes a transmit board carrying N light-emitter elements called "link elements". Each emitting link element is associated with a designated incoming link to deliver an optical signal reproducing the modulations of the signal delivered by said incoming link. A receive board carries P light receiver elements called "link elements". Each receiver link element is associated with a designated outgoing link to deliver to the latter an electric signal reproducing the modulations of the light flux which it receives. Optical means projects an image of the transmit board onto the receive board. Each of the link elements of one of these boards includes an array of elementary optical or electro-optical components. The number of components in the array is equal, at least, to the number of link elements of the other board. Further communication means make it possible to connect at least one of these elementary components to the link associated with the link element.

This prior art device offers, in principle, numerous advantages over the previously proposed devices for signal switching by optical means. The previously proposed devices utilize, for the purpose of directing the switching optical beam or beams, deflector devices of mechanical-optical, electrooptical, audio-optical, etc. nature. The prior art device is free of certain constraints (such as the necessity of using sources of coherent light) and drawbacks (such as the deterioration of the signal-to-noise ratio due to losses of light by absorption) which result from the use of such deflector systems.

However, in order to be truly operational and, in particular, to be usable within an automatic switching unit, the prior art device still lacks the essential elements for enabling control of switching means by the call signals, the call acknowledgment signals, the addresses of incoming links and addresses of outgoing links, etc. These functions, which impose the addition of control circuits and numerous electrical links connecting these control circuits with the incoming and outgoing links, complicate the construction and cause the loss of a major proportion of the advantages of optical switching.

Moreover, such a device can function correctly only if there are precise geometrical spatial relations between the elementary optical or electro-optical components on one hand which constitute connecting elements of one of the boards and, on the other hand, connecting elements of the other board. To avoid a prohibitively large volume and for reasons of reliability and economy of construction, it is obviously necessary, especially in the case of large numbers of incoming and outgoing links, to minaturize the linkage elements constituted by assemblies of elementary components by constructing these elements in the form of integrated circuits (matrices of light emitting diodes or photodiodes, for example, to perform the function assigned to the linking elements). In this case, the requirements of manufacturing precision are of the highest order. In addition, even if the carriers for the linking elements and the optical elements are produced in accordance with these same requirements, the slightest mechanical deformation during operation, due for example to differential thermal expansion, risks rendering the switching device inoperative.

The purpose of the present invention is to remedy these drawbacks or difficulties. The invention makes it possible firstly to ensure the functions of switching control by supplementary electro-optical or opto-electronic elements integral with the transmitter and/or receive board and which can be integrated, to a large extent, with the transmission links associated with these two boards. The invention enables a considerable reduction or even to complete elimination of all electrical connections between the two boards, even if the switching device is employed within a complete automatic switching unit. However, the invention also makes possible, by means of other additional electro-optical or opto-electronic components integral with the boards (which components may similarly be integrated with the linkages to a major extent) permanently to control and correct detrimental geometrical deformations. The corrections can moreover be effected automatically by mechanical or electronic means. In addition, the required supplementary components can also be used to realize some of the aforementioned switching control functions.

In the following, various forms of embodiment of the invention will be explained in detail with reference to the attached drawings, in which.

FIGS. 1, 2, 15 and 16 and the descriptions referring to them, being directed to prior art switching devices, are are useful to show the types of incoming and outgoing links (electrical conductors and/or light conductors) to which the invention is applicable useful to show and to call to mind the mode of functioning of these devices.

Figure 1:
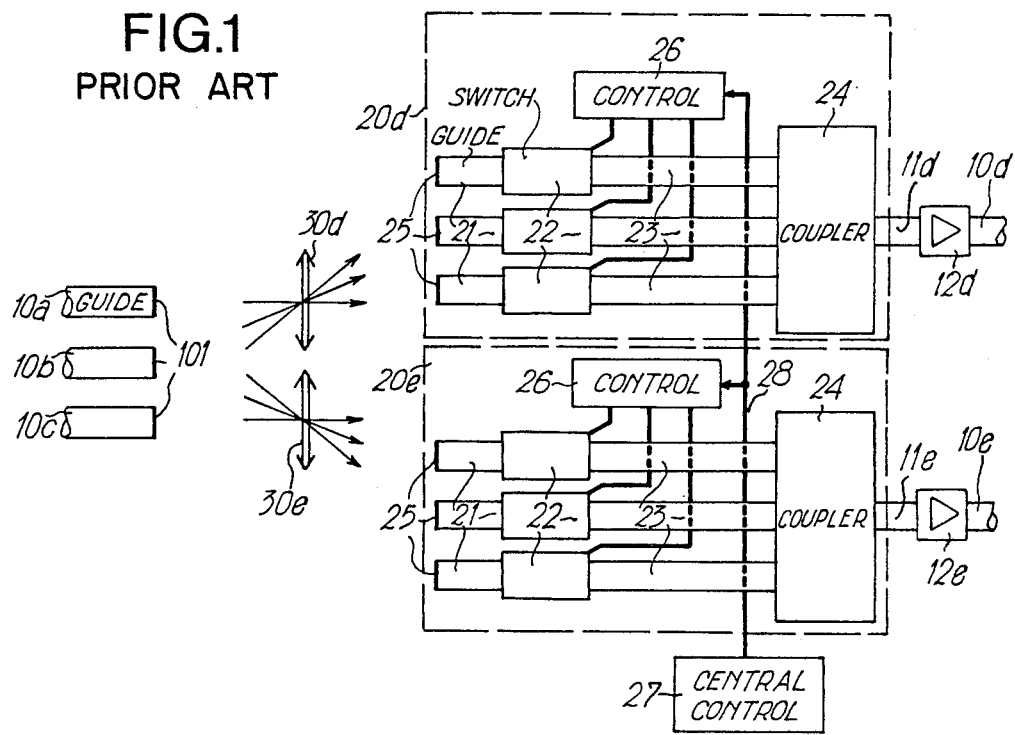
FIG. 1 is a block diagram of a first embodiment of the switching device of the aforementioned type in which the dispositions according to the invention can be advantageously applied.

The switching device of FIG. 1 comprises $N=3$ input links in the form of light guides 10a, 10b and 10c and $P=2$ output links in the form of light guides 10d and 10e. The end faces of guides 10a, 10b and 10c constitute the light sources which are the link emitter elements of the emitter board. The link receiver 20d, having an output connected to the guide 10d through a light amplifier 12d has $N=3$ light guides 21, each series-connected to a guide 23 via an optical switch 22. The switches 22 are controlled by an electronic control unit 26. The three guides 23 are connected in parallel to the input guide 11d of light amplifier 12d through an optical coupler 24. The link receiver element 20e, connected to the guide 10e via the light amplifier 12e, is identical to the receiver element 20d.

A lens 30d projects, respectively, the three images of the said light sources on the end faces 25, optically conjugated with the said sources, of guides 21 of the receiver element 20d. A lens 30e projects, respectively, the three images of the said sources on the end faces, optically conjugated with these sources, of the guides 21 of the receiver element 20e. The receiver board is thus constituted by the $N \times P = 3 \times 2$ faces of the guides 21, whilst the switching means are constituted by the optical switches 22, control units 26 for switches 22, the guides 23 and the couplers 24.

A central control unit 27, connected to the control units 26 by a common link 28, delivers the switching instructions. The latter are executed by each switch 22 affected thereby by interrupting or by establishing the optical link between the corresponding guides 21 and 23. The optical couplers 24 function as adders. The unit 27 thus makes it possible to control the execution of any switching function between the input guides 10a, 10b and 10c on one hand and the output guides 10d and 10e on the other.

Figure 2:
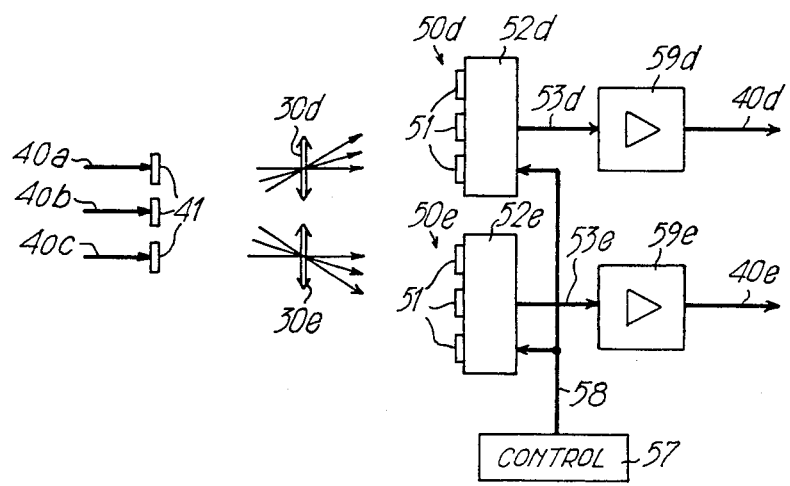
FIG. 2 is a variant of the diagram of FIG. 1.

The link emitter elements of the emitter board are illustrated in FIG. 2 as including three light emitting diodes 41, respectively modulated by the electrical signals conveyed by three input conductors 40a, 40b and 40c. The receiver board comprises two link receiver elements 50d and 50e, each having an array of three receptor cells (photodiodes) 51. Each receiver element 50d and 50e also has a switching circuit 52d (52e), making it possible to establish or to interrupt the electrical link between at least one photodiode 51 and an output conductor 53d (53e). The lenses 30d and 30e enable the active faces of the three emitter elements 41 to be conjugated with, on one hand, the sensitive faces of the three photodiodes 51 of receiver 50d and, on the other hand, with the sensitive faces of the three photodiodes 51 of the receiver 50e. Each outgoing conductor 53d or 53e is connected to the conductor 40d or 40e which constitutes the corresponding outgoing link, through an amplifier 59d or 59e.

The two devices shown in FIGS. 1 and 2 offer the same switching facilities. It is moreover possible to form mixed switching devices, that is, devices in which the input and output signals are not of the same nature. Thus, the input links may be light guides (in which case the light sources are the extremities of these guides) whilst the output links are electrical conductors (the receptor cells then being semiconductors). However, the input links can be electrical conductors (the sources being semiconductors) and the output links formed by light guides (in which case the receptor cells of the receivers are the end faces of these guides).

It is also possible to form a device in which the input and output signals are optical, although the receiver board comprises optoelectronic cells delivering electrical signals. Such a device comprises, for example, an emitter board such as that in FIG. 1 and a receiver board like that in FIG. 2. In fact, it suffices to connect an optoelectronic transducer to the output of each amplifier 59 (FIG. 2) and to expose to the luminous flux of said transducer an optical coupler for collecting the light flux to transmit the latter to a light guide.

Each link receiver element of the switching devices in FIGS. 1 and 2 must comprise an internal control circuit (26 in FIG. 1, integrated into the switching circuit 52d or 52e, FIG. 2) capable of recognizing and executing the switching instructions addressed to the receiver by the central control unit 27 or 57, optical or electrical output links of the elementary receptor cells, optical gates (22 in FIG. 1) or electrical gates (integrated into the switching circuit 52d or 52e, FIG. 2), making it possible to interrupt and to reestablish these links and lastly a control network constituted by control links enabling the internal control circuit to actuate the gates.

The number of control links constituting the control network of each receiver element can be considerably reduced if the elementary cells of each receiver element (and, in consequence, the sources of the transmit board) are disposed in rows and in columns to form a matrix. It then becomes possible to substitute the individual control links connecting each elementary cell to the internal control circuit by control links connecting said circuit to each of the rows and each columns of the matrix.

Figure 3:
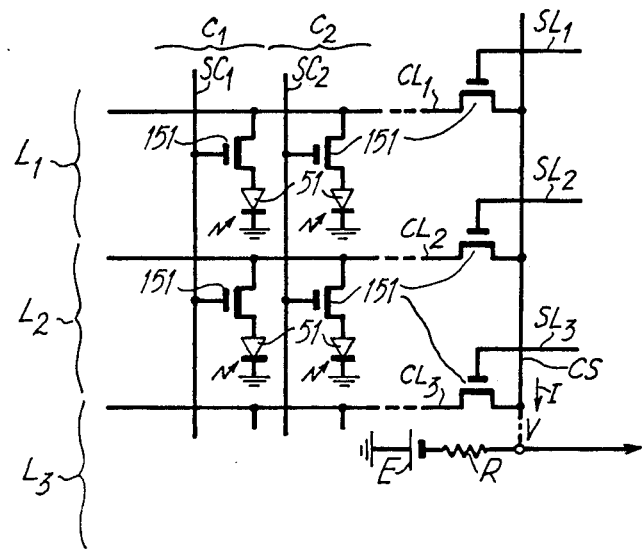
FIG. 3 is a partial electrical circuit diagram of a random-access opto-electronic integrated component which can be advantageously used as receiver link element in the first embodiment.
Figure 5:
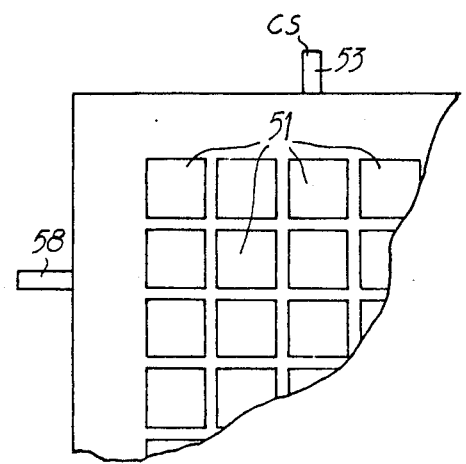
FIG. 5 is a schematic frontal view of the component.

With this end in view, FIGS. 3 and 5 are illustrations of a known integrated circuit random-access photodiode matrix which can be used as link receiver element in the switching device according to the invention. In FIG. 3, the photodiodes 51 are identified by the intersection of rows L1, L2, etc., . . . and columns C1, C2, C3, etc. Each photodiode 51 can be biased by the voltage delivered by a common current source E through a resistor R. For each photodiode 51 of index ij (where i and j can assume the values 1, 2, 3, etc., . . . ), the biasing is controlled by two series connected switches 151, each constituted by at least one P-conducting MOS transistor. One of switches 151 in each pair is selectively forward biased, by a voltage applied by a row selector control link SLi, to connect the corresponding row channel CLi to the common output channel Cs. The other switch 151 in each pair is selectively forward biased by a column selector control voltage SCj common to the bases of all the transistors assigned to all the photodiodes 51 of a given column to connect the corresponding photodiode to the corresponding row channel CLi. The result is that when a photodiode 51 excited by a light signal is selected by the control voltages respectively applied to the selector control links of the rows and column to which it belongs, the current I circulating in the output channel CS or the voltage V at the terminals of the resistor R reproduce the amplitude of the light signal.

Figure 4:
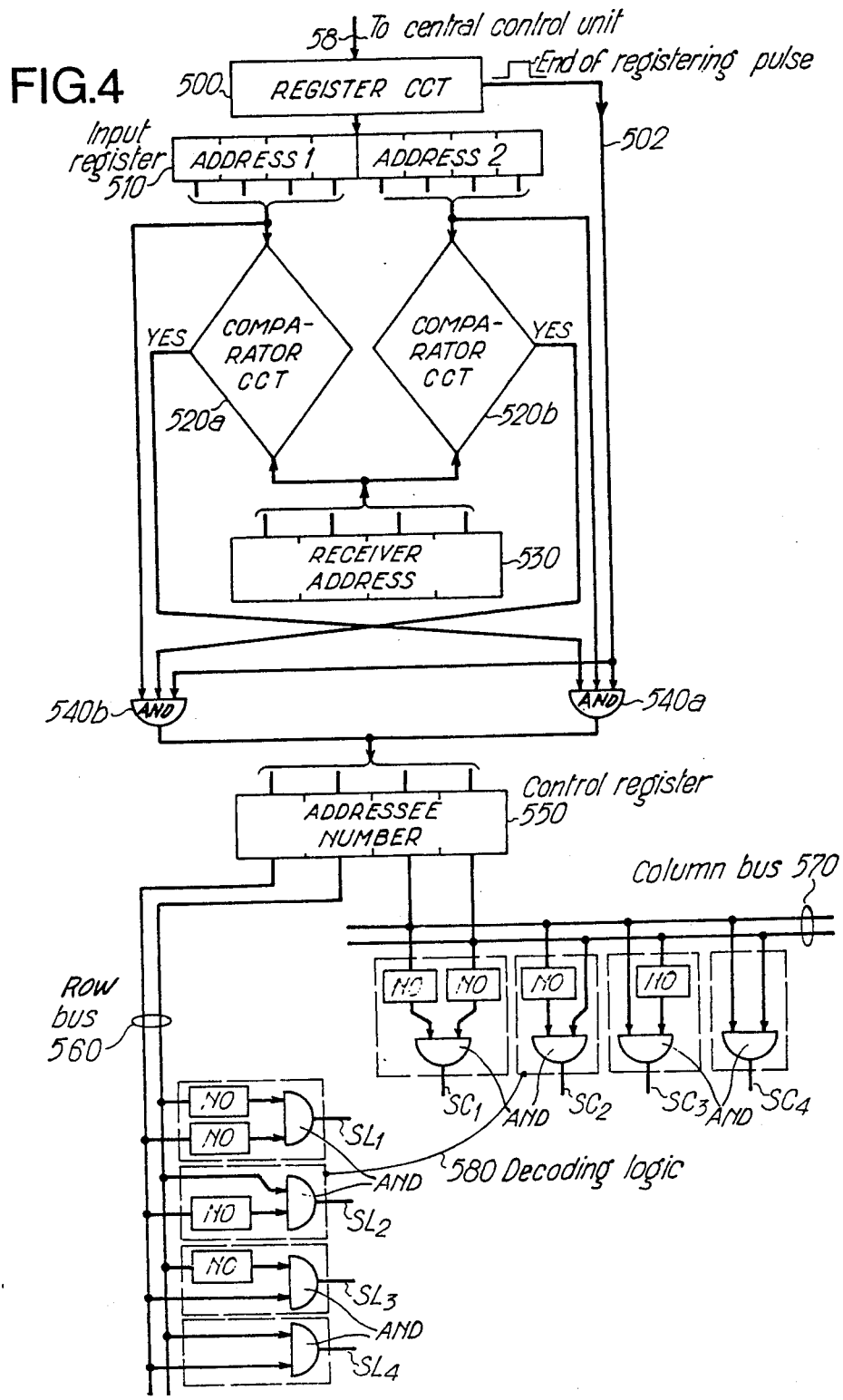
FIG. 4 is an electrical diagram of the control circuit integrated with this component.

FIG. 4 is a general diagram of a receiver control circuit including N=16 receptor cells disposed in 4 rows and 4 columns. The photodiode matrix, the linkage channels, the network and the control circuit can be advantageously integrated within the same electronic component, so that the integrated receiver circuit has, as its sole external connections (apart from the power supply and, optionally, a synchro input) an information output 53 leading to an amplifier 59 (FIG. 2), and control input 58 responsive to a signal from the central control unit 57. The register circuit 500 converts to parallel the series signals received over the link 58. Input register 510 stores connection instructions received from central control 57; said instructions being constituted by an address pair designating a pair of links to be connected (that is, an input link and an output link). Comparator circuits 520a and 520b compare, respectively, one or the other address with the address of the receiver initially registered in memory 530. If at the end of registration, signalled by a pulse transmitted by circuit 500 over link 502, a comparator circuit 520a or 520b recognizes the address of its receiver as being the same as one of the addresses of register 510, that causes comparator the other address to be registered in the control register 550 by way of an associated AND gate540a or 540b. The two most significant bits of register 550 are then sent over a row bus 560, while the two least significant bits of register 550 are transmitted over a column bus 570. The bus address signals are translated into a signal transmitted over the corresponding row and column selector controls SLi and SCj, respectively, by conventional decoding logic networks 580, illustrated in FIG. 4 as including an array of AND gates and inverters (NO). The interruption of a previously established connection between an input link A and an output link B on one hand, and an input link B and an output link A on the other hand can be effected by two connection instructions "address A,X" and "address B,X", in which X is either (a) an unused address or, (b) if the receiver is used in an automatic switching unit, the address of a general-purpose tone generator (for example a dialing tone generator)

FIG. 5 is a view of the illuminated face of the receiver assembly wherein the internal control and switching circuits have been described above with reference to FIGS. 3 and 4. In FIG. 5 are illustrated the sensitive areas of the photodiodes 51, which constitute the receptor cells, as well as the connector bar of information output (53 in FIG. 2, CS in FIG. 3) and the connector bar of control 58.

Figure 6:
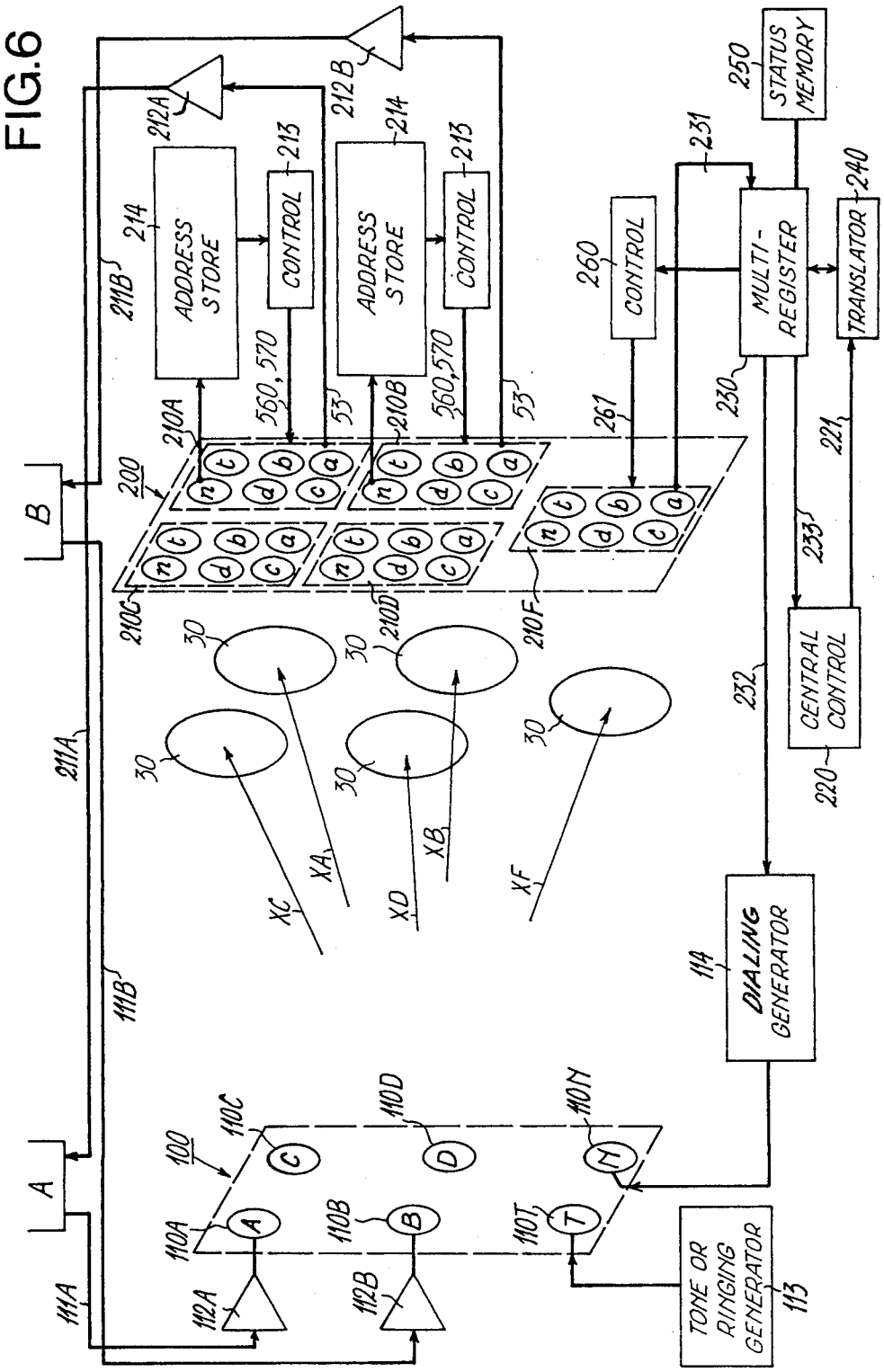
FIG. 6 is a diagrammatic view, partly in perspective, partly in the form of a block diagram, of a local automatic telephone switching unit, comprising a switching device embodied according to the first embodiment and in accordance with the invention.

FIG. 6 is a diagram of an automatic telephone switching unit equipped with a switching device according to the invention, wherein the input and output links are electrical conductors. The link transmitter elements (light source) of the transmit board 100 are opto-electronic transducers, for example light emitting diodes 110, disposed in matrices. The receive board 200 is constituted by plural receiver elements 210, which may be random-access photodiode matrices of the type described with reference to 3, 4 and 5. Each subscriber line is therefore connected by an input link to a light emitting diode 110 and by an output link to a photodiode matrix 210. Subscriber A is, for example, connected to the source 110A by the input line 111A and an amplifier 112A. The subscriber A is connected to the output of the matrix 210A through the output line 211A and the amplifier 212A.

Each receiver 210 is fitted with an objective lens 30 which projects the image of the transmit board 100 onto the receiver. Board 100 includes light sources 110, disposed so that the image of each source is projected on to a photodiode occupying the same location in all the receivers 210. In other words, the image of source A is projected onto photodiode a of all receivers 210, the image of source B is projected on photodiode b of all receivers 210, etc.

According to the invention, the transmit board 100 also comprises the following additional elements:

light emitting diodes (such as diode 110T) designed to emit calling and ringing tone optical signals; each of these diodes is controlled by a permanently operative as tone or ringing generator (such as generator 113);

light emitting diodes (such as diode 110N) designed to emit dialling tone light signals; each of these diodes is controlled by a dialing generators (such as generator 114).

According to the invention, the light emitting diodes 110T and 110N correspond to receptor cells (photodiodes) conjugated, t and n in each receiver 210. Receiver board 200 comprises additionally, according to the invention, a functional receiver 210F, the task of which is detailed later. This functional receiver 210F may be either identical to the other receivers 210, or a sequential scanner of the CCD type (charge coupled device). Photodiodes of receiver 210F are optically conjugated with the sources 110 by objective lens 30F.

The control circuit associated with each receiver 210 (210A, 210B, etc., . . . with the exception of the receiver or receivers 210F) is shown in exploded view in FIG. 6 to bring out the different functions and to facilitate the understanding; however, the control circuit can advantageously be integrated into the receiver as described with reference to FIG. 4. The control circuit comprises, firstly, a control circuit 213 which delivers to the control buses 560 and 570 (FIG. 4) the voltages enabling the switching of a photodiode a,b,c,d . . . t specified on the output circuit 53 (FIG. 5), and further an address store 214 connected to the outputs of the photodiodes n for transmitting to the control 213 the the appropriate connection instructions.

The automatic switching unit in FIG. 6 comprises a central control unit 220, at least one multi-register 230, a translator 240 and a status memory 250. The multi-register 230 delivers to the functional receiver element 210F, via a control circuit 260 and a line 261, the switching instructions enabling the successive switching of each photodiode of the receiver element 210F on its output channel 231. The successive photodiode switching provides a cyclical scanning of the sources 110 of the transmit board 100. The signal samples resulting from this scanning are retransmitted over the line 231 to the multi-register 230 in order to enable the latter:

(a) to detect the communication events (new call, end of conversation) by comparing the current state of the subscriber line with the preceding state stored in the memory 250, (b) to register the dialling signals transmitted by the subscriber.

The multi-register then has the necessary information for establishing or interrupting a communication. To this end, it can:

(a) call on the translator 240 to be advised of the correspondence between a called number and a physical address (that is to say, an internal address of the automatic switching unit) of the subscriber or of the circuit, (b) operate the dialing-tone generator 114 (to which it is connected by a line 232), and (c) deliver to the central control unit 220, over a line 233, information enabling the unit to supervise the functioning of the switching unit and to charge the caller at the end of the communication.

In the following, the functioning of the automatic switching unit of FIG. 6 is summarized in the event of a communication in which subscriber A is the caller and subscriber B is the addressee. It is assumed that the communication is a local one, that is, the two subscribers are connected to the same automatic switching unit. To simplify the description, it is further assumed that the automatic switching unit has a single multi-register 230 and that the transmit board comprises a single dialling signal source 110N. In addition, the reference "receiver" or "receptor element" is applied to the assembly constituted by a receiver element 210, its control 213 and its address circuit 214. The operations are as follows:

(a) A lifts the receiver, causing activation of source 110A;

(b) the multi register 230, observing, in the course of its scanning operation, a change in the state of the photodiode a of receiver 210F by comparing its previous state stored in memory 250, registers the occurrence of a new call and causes the transmission by the generator 114 controlling source 110N of a pair of signals "address of A—address of a dialing tone generator", the second address being, for example, that of the source 110T;

(c) the receiver 210A, recognizing the address of A in the pair of signals received by its photodiode n, switches the appropriate diode t to line 211A;

(d) the subscriber A therefore receives the dialing tone and dials the number of B on his set;

(e) the multi-register 230, whilst awaiting a dialing, as it cyclically scans the subscriber A (photodiode a of receiver 210F), registers the number of B dialed by A, causes transmission by the generator 114 and the source 110N of a "address of A—address zero" pair on receiving the first dialed number to interrupt the transmission of the dialing tone, interrogates after registering the translator 240 to acquire from the latter the address of B, checks whether B is free and, in the affirmative, causes the transmission by the generator 114 and the source 110N of "address of B—address of ringing generator" pair and then of "address of A—address of an answering tone generator";

(f) the receiver 210B identifies itself on reading the address of B and switches to the appropriate ringing tone generator T;

(g) the receiver 210A identifies itself and switches to the appropriate answering tone generator T;

(h) when B lifts the handset, the multi-register 230, which continues sequential scanning of the transmit board 100 because it includes functional receiver element 210F, detects the change of source 110B from the rest state to the active state, is informed by its status memory 250 that B is answering the call, causes the transmission by the generator 114 and the source 110N of a "address of B—address of A" pair and supplies to control unit 220 the data necessary for charging the cost of the call (i) the receiver 210A identifies itself and switches to the source 110B, whilst the receiver 210B identifies itself and switches to the source 110A;

(j) when the subscriber (for example A) replaces the handset, the multi-register detects (by means of its receiver 210F) the change of source A from the active to the rest state, causes (by the generator 114 and the associated course 110N) the transmission of an "address of A—address zero" pair then of a "address of B—address of the dialling tone generator (or communication cut-off)" pair and informs the control 220 of the end of communication;

(k) the receiver 210A identifies itself and interrupts the optical link with the source 110B;

(l) the receiver 210B identifies itself and switches to the source 110N (dialling tone); B can then either dial a call or hang up.

The appropriate procedure in the case of an engaged subscriber or in the case of an incoming or outgoing communication can easily be deduced from the foregoing. The same generator 114 can be used for the signalling transmission on outgoing circuits (local or long-distance).

In the above-described embodiment of the automatic switching unit, the transmit board is provided with additional transmitter sources 110N for delivering dialing signals and each receiver 210 comprises photoreceptor elements n which constitute an associated supplementary receiver element for observing these sources and retransmitting the signals to the corresponding circuit 214 which recognize the address of said receiver. The retransmission of these dialling signals is permanent and is effected by a non-switching special link. Thus there is no electrical connection of any kind between the subscriber receivers and the central control. The switching functions particular to each subscriber installation are provided by the subscriber equipment of the of the switching unit, of which the receiver is an element.

Thus, the automatic switching unit in FIG. 6 offers simultaneously the following advantages, some of which appeared to be hitherto more or less incompatible:

large-scale integration (the principal factor in cost reduction) at the level of the link receiver elements, smaller number of connections, only the operational receiver 210F being connected to the multi-register 230;

simplicity of design because the connection network in constituted at a rate of one chain per subscriber, by chains of linear and independent modules;

the possibility of embodying the major portion of the automatic switching unit by the use of a restricted number of types of modules; and low degree of breakdown implications, given that the breakdown of a component of a "subscriber chain" affects only a single subscriber.

It is also possible to visualize the decentralization of the control functions. Each link rceiver (of the subscriber then comprises its own scanning circuit, its own event detector and dialing register circuits. It is possible to avoid the provision of a status memory for each receiver by means of an unambigously recognizable signal (abnormal luminous intensity . . . ) transmitted by the "removal" and "replacement" transmission of the subscriber. The systematic scanning can be carried out either exclusively apart from the communications or both apart from and during the communication. The scanning during communication, useful for permitting services such as notice of call during communication, requires brief interruptions in the retransmission of information. These interruptions do not accumulate on a link between two subscribers attached to different offices, because the scanning during communication is useful only for the subscribers' receivers (only one per link). When opting for a scanning exclusively outside a communication, the "replacement" of A causes the interruption of the optical link of the transmitter of A in the direction of the receiver of B, but the receiver of A must be informed of the end of communication to free it (interruption of the optical link of B in the direction of A) and to allow it thus to resume the scanning, to prevent B from not "inactivating" A either accidentally or maliciously by failing to replace the receiver. This information can be conveyed to the receiver either over a special link between the associated source and receiver, or by periodic scanning (for example once every second) the associated transmitter in the course of communication, which again necessitates a brief interruption of the communication. In this option of decentralized control functions, the problems of translation can be resolved by having each receiver element identify itself in a called number. The receiver element of addressee B knows the physical address of caller A, but the receiver element of A does not know the physical address of B. Caller B can make known its physical address by transmitting the logical number of A, which implies that the transmitter of A has transmitted during the dialling phase the logical number of B and its own logical number, and that a link between associated transmitter and receiver allows the receiver of B to instruct the transmitter of B to transmit the "logical number A—logical number B" pair. The transmission of this last number permits the receiver of A to ascertain that B, and not a third subscriber C, is dialling A at this instant. This link between associated transmitter and receiver is not useful for incoming circuits of local subscribers if an identity exists for the latter between the physical address and the low rank of the logical number (for example MCDU figures of an exchange with 10,000 subscribers); in this case caller A easily deduces the physical address of B from its logical number. In the case of outgoing communications, an entire circuit group identifies itself within a dialed logical number and the simplest solution for designating one of these circuits for the requested communication can be achieved by a central element acting as a multi-register, and concerning itself only with outgoing communications. In contrast to the system described with reference to FIG. 6, source 110N associated with the outgoing circuit assigning multi-register is monitored by a receiver element A only when the subscriber A requests an outgoing communication. The receptor cells n associated with the source 110N can then be switched cells, identical to the other cells. The interruption of a communication does not require the intervention of the multi register. The metering is carried out by the central control or by an autonomous metering unit monitoring the course of the communications through an intervening scanning receiver, independent, of the type 210E. In any case, there are mere variants which do not modify the opto-electrode assemblies of the switching device.

In order to obtain an optimum luminous output and as low a crosstalk as possible, it is necessary to achieve good coincidence, in the plane of the receive board, between the elementary receptor cells of the receiving elements and the source images fed by the optical system to these receptor cells. As seen in FIG. 6, the axes XC, XA, etc., . . . of the light beams which form the images of the transmit board 200 on the receiving elements 210C, 210A, etc., . . . are not parallel. It is necessary to center each objective 30 on the axis of the corresponding beam and to adjust the angular position of the receiver board relative to that of the transmit board. If objective 30 is not so centered, the images reaching the peripheral receivers are deformed and the coincidence is faulty. The half-axes of the objectives 30 are then smaller than the half-axes of receivers 210, which complicates the machining of these various parts.

On the other hand, the distance between each objective 30 and the receiver 210 corresponding to it is much smaller than the distance of said objective from the transmit board 100, due to the reduction in size which the transmit board image must undergo during projection. By way of an example, if the transmit board 100 is a square of 1 meter side length (10,000 transmitters of 1 $cm^2$ each) and each receiver 210 is a square of 5 mm side length, the reduction ratio is 200.

The diameter of the objectives 30 is limited on the one hand by the compactness requirements of the receive board 200 and, on the other hand, by the necessity of maximising the received luminous power. The choice of the numerical aperture is a compromise between the economic constraints and the qualitative requirements of the image on one hand, and the necessity of obtaining the most powerful output of the optical link on the other hand. A numerical aperture of 5 to 6 can be adopted. Under these conditions, an objective 30 having a 1 cm diameter is located 10 or 12 meters from the transmit board 100, but only 50 or 60 millimeters from the corresponding receiver 210.

Figure 7:
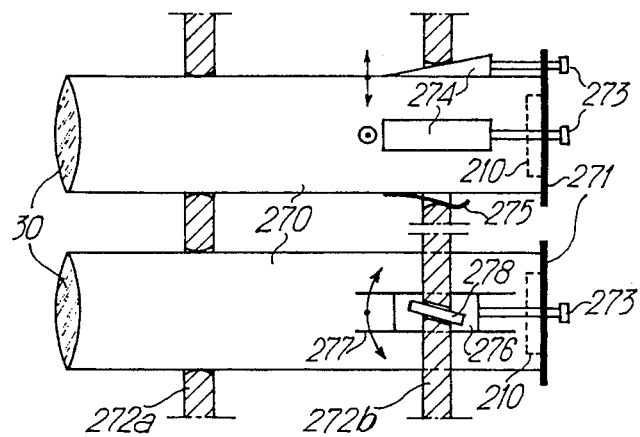
FIG. 7 is a schematic sectional view of a part of the receiver board of the automatic switching unit in FIG. 6.

It is therefore advantageous to combine each objective 30 and the corresponding receiver element 20 in a common mount to form a sighting unit. The sighting unit must be precisely positioned relative to the transmitter element, as can be achieved either by a high-precision machining of the mechanical support for the receivers, or by individually adjusting the position of the receivers on this support. This latter situation is considered in FIG. 7 wherein each receiver element 210 is fast with the bottom 271 of a blind tube 270. The end of the tube 270 opposite bottom 271 carries the objective 30. The tubes 270 are threaded into apertures provided in two parallel plates 272a and 272b which constitute the base support of the receive board. The most critical parameters of positioning objectives 30 are the orientation of the axis of the sighting unit, (in consequence the orientation of tube 270), and the angular position of the sighting unit about this axis. The adjustment can be confined to these parameters. FIG. 7 is an illustrative of an examplary adjusting device. The sighting units 270 can slide and oscillate about the centers of holes provided in the front plate 272a. Holes provided in the rear plate 272b have a substantially greater diameter than the diameter of the body of the sighting units. In the upper half of FIG. 7 is illustrated an alignment means constituted by two wedges 274, each having a base which slides in longitudinal grooves (not shown) in the body of the sighting units along two generatrix lines spaced from each other by an arc of 90°. The oblique faces of the two wedges bear against the wall of the corresponding hole of plate 272b. Elastic return of the sighting unit body is provided by two blade springs 275 mounted opposite to the wedges 274. Sliding of the two wedges 274 is effected by arrester screws 273 which engage threaded holes provided in the bottom plate 271 fast with the body 270.

In the lower half of FIG. 7 is illustrated an adjustment means for orienting the sighting unit about its axis. The orienting means includes a slide 276, also actuated by means of screw 273, slidable in a longitudinal groove 277 provided in the body 270. Slide 276 carries an oblique stop 278 which engages an oblique guiding groove formed in the circumference of the hole of plate 272b. Complementary means, not illustrated in FIG. 7, make it possible to adjust the longitudinal position of the sighting units relative to the plate 272b to compensate for dispersion of the real values of the focal lengths of the objectives 30 relative to the nominal value thereof.

Figure 8:
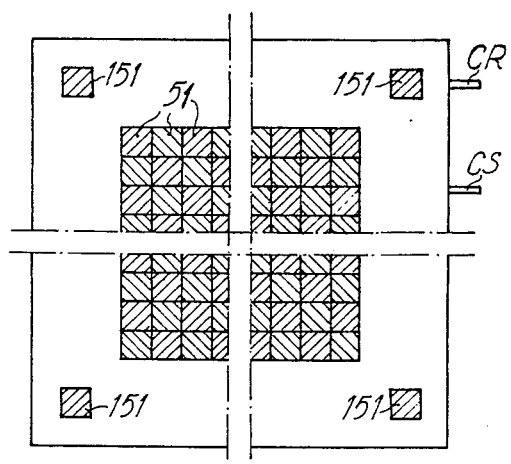
FIG. 8 is a front view of a receiver link element mounted in this receiver board.

Adjustment control can be provided by reference receptor cells associated with the receiver element. FIG. 8, an illustration of the appearance of a receiver thus completed, includes a matrix array of photodiodes 51 and the output connection CS. At the four corners of the matrix are located additional photodiodes 151 connected over a calculator circuit (not shown) to an adjusting connection CR. The corresponding transmit board, not illustrated, is equipped with reference sources conjugated with the photodiodes 151 by means of the associated objective of the receiver. The analog of digital computer circuit delivers via the output CS a signal used for optimum adjustment of the orientation of the sighting unit.

Figure 9:
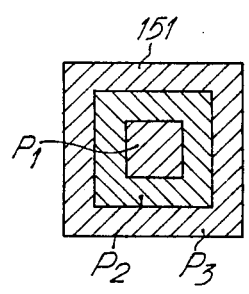
FIG. 9 is a frontal view of a receiver cell of an additional positional reference element associated with this receiver link element.

Advantageously,
reference photodiodes 151 and the reference sources associated with the transmit board can be used, respectively, as photodiodes for the reception of the dialing signals (n in FIG. 6) and as transmission sources of such signals (110N in FIG. 6);

(b) reference photodiodes 151 are formed by an assembly (FIG. 9) of concentric plates P1, P2, P3, ... etc., of decreasing sensitivity, which makes it possible to reduce the computer circuit to a simple analog adder, with the adjustment consisting in turning three screws to maximize the signal at the output CS.

The positional and orientation adjustment of the sighting units can be advantageously automated as illustrated in the embodiment of FIGS. 10, 11, 12, and 13. In FIGS. 10–13 each of adjusting wedges 274 (as well as the not illustrated slider 276) is fitted with a nipple 279, which passes through a longitudinal slot provided in the body of the sighting unit 270. The receiver element 210 comprises, not one but three adjusting output connections CR, each of which derives an adjusting current which is a function of the deviation of position to be compensated by means of the wedge 274 (or the slider 270). The adjusting current derives by each output CR is processed by means of a computer integrated with the receiver element. Operation of the receiver element 210 necessitates a subdivision of the reference receptor cell or cells 83 (FIG. 8) into surfaces having an appropriately finer structure than that shown in FIG. 9.

Figure 10:
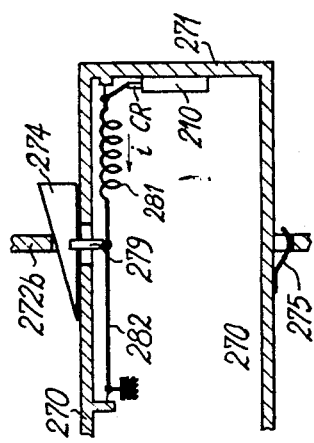
FIGS. 10, 11, 12 and 13 are schematic axial sections of diverse variants of the automatic positional control means associated with this receiver link element.

In FIG. 10, the nipple 279 is connected on one hand to a helical return spring 281 fastened to the bottom of the sighting unit body 270 and, on the other hand, to an electrically grounded, thermally expansible traction wire 282 which draws the nipple 279 towards the front of the sighting unit. The adjusting current derived by the output CR corresponding to receiver 210 flows through the electrical series circuit including spring 281 and the wire 282 As the current derived by output CR increases, there is greater heating of, wire 282 by Joule effect, causing nipple 279 to be drawn towards the bottom of the sighting unit.

Figure 11:
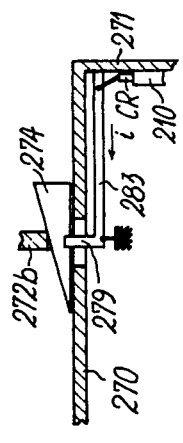

In FIG. 11, the traction wire 282 and the return spring 281 are replaced by a rigid thermally expansible rod 283, connected to the corresponding CR link; first and second opposite ends of rod 283 are respectively mechanically fixed to bottom 271 and carry the nipple 279, which is electrically connected to ground.

The structures illustrated in FIGS. 10 and 11 imply that the adjusting current always flows in the same direction and require a current throughput of a nominal value such that the adjusting movement remains adequate. The result is a permanent consumption of electric current and a fairly substantial heating of the elements through which the current passes, as well as the adjacent elements.

Figure 12:
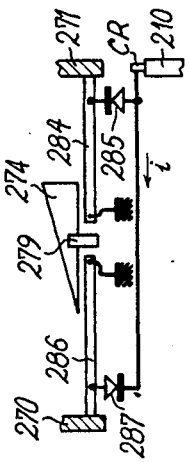
Figure 13:
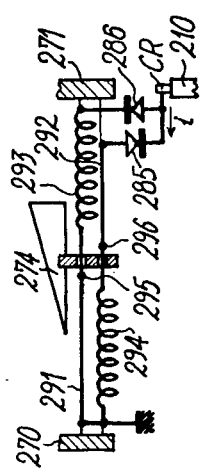

This drawback can be avoided by means of the embodiments shown in FIGS. 12 and 13 wherein the output CR delivers a current having a direction, i.e., polarity, that is a function of the deviation to be compensated to bring the nipple 279 back into its correct position. In FIG. 12, the forward correcting movement which may be necessary is exercised by a rigid thermally expansible rod 284, having one end mechanically connected to base 271 and electrically connected to the output CR by a diode 285, poled in the appropriate direction. A free, electrically grounded end of rod 284 pushed nipple 279 forward to base 271. When the correct position is reached, the output stops delivering current and the rod 284 retracts itself. The rearward return movement of nipple 279 toward base 270 is effected in a similar manner by a rigid thermally expansible rod 286, having a front end mechanically connected to the body 270 and supplied with current by the output CR via diode 287 poled in the appropriate direction. The free end of rod 286, oriented towards the nipple 279, is electrically grounded. In FIG. 13, the thermally expansible rods 284 and 286 are replaced by thermally expansible traction wires 291 and 292, respectively supplied and tensioned by means of traction springs 293 and 294 and diodes 286 and 285. An abutment effect is provided by stops 295 and 296 which, respectively provide the mechanical joint and the electrical contact between each traction wire and its spring.

If more extensive adjusting movements are required, the thermally expansible wires or rods shown in the FIGS. 10, 11, 12 and 13 can be replaced by double blades.

In order to relieve the mechanical loads imposed on the adjusting elements described above with reference to FIGS. 10-13, it is possible to being about by devices of the same nature relative displacements of the receivers 210 and the bodies of the sighting units 270 instead of causing relative displacements of the bodies of the sighting units and the plates which support them.

The adjusting means previously described in connection with FIGS. 7 to 13 make it possible to utilize receiver supports of a simpler mechanical embodiment. The adjusting means on FIGS. 7-13 are much less demanding with regard to the required machining precision. The automatic adjusting means (FIGS. 9 to 13) offer the additional advantage of self compensating the slow support deformations which could result, for example from differential thermal expansions.

In accordance with a different embodiment, the invention provides a structure which avoids the requirements for high-precision and expensive mechanical supports and positional correction devices; this different structure, however, introduces some complication into the receivers and control electronics thereof. In this structure, the receptor cell or cells assigned to the transmission of a signal delivered by a specific transmitter and addressed to a specific output link are selected by the receiver element assigned to the output link as a function of the position occupied by the trace relative to at least one reference beam delivered by at least one reference transmitter element. The reference beam is incident on a plurality of reference receptor cells.

Figure 14:
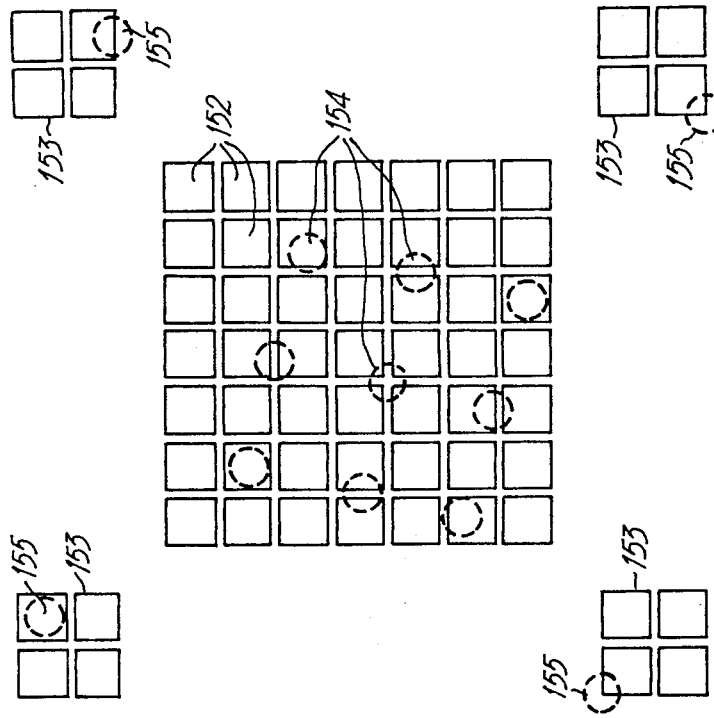
FIG. 14 is a frontal view of a receiver link element according to the invention in which the disposition of elementary photoreceptor cells enables elimination of positional control means.

FIG. 14, an illustration of a simple form of the different embodiment, includes a receiver element formed as a mosaic of receptor cells 152 (receptor mosaic) with dimensions and a position such that it receives, through the objective associated with the receiver, all the images of the transmitting sources of the transmit board which are fed with the signals of the incoming links. The receiver of FIG. 14 further comprises a reference mosaic of reference cells 153 which receives the images of a plurality of reference transmitters disposed on the transmit board. Each reference transmitter delivers and image 155 on a portion of the reference mosaic. In the example illustrated in FIG. 14, the receptor mosaic is a square matrix of 7×7 receptor cells 152 and the transmit board comprises a square matrix of 3×3 sources which are supplied by an equal number of incoming links; the images of the transient board form a square matrix of 3×3 images 154 all included in the surface area of the receptor mosaic. The reference mosaic itself is "exploded" into 4 matrices each having 2×2 reference cells 153 distributed around the receptor mosaic, for example in proximity of its corners. Each reference matrix 153 receives the image 155 of the 4 transmitters which occupies a homologous position in the transmit board.

The receiver control 213 (see FIG. 6) includes, in this embodiment, a computer capable of supplying, on the basis of the indications derived by the reference cells 153 (that is on the basis of the position of cells 153 which are responsive to the light beams of the reference receivers) the address of the receptor cell or cells 152 on which is formed the image of a specific source of the transmit board. More precisely, the computer (which need not be described because its embodiment is obvious to those skilled in the art) determines, from the address signals of the receivers delivered by the address register and recognition unit 214 (FIG. 6) and from the addresses of the reference cells on which are formed the images of the reference sources, the address or addresses of the receptor cells to be switched to the corresponding outgoing link of the receiver to transmit to the link the signals delivered by a specific address source.

To avoid any risk of crosstalk, it is necessary to be sure that a given receptor cell is incapable of receiving simultaneously the image of two adjacent sources. This condition is achieved by conferring to the optical or geometric parameters of the system such values that the interval between two adjacent images is greater than the dimension of a cell. It is also necessary to limit as far as possible the light losses due to those images parts which reach blind zones of the receiver, in other words the space between cells. This condition is satisfied by designing the images of the sources to have substantially greater dimensions than the width of the spaces (for example by defocussing the images by offsetting the optics).

These conditions are accounted for in the embodiment of FIG. 14, wherein the diameter of the circular source images is substantially equal to the width of each of the receptor cells. The "lineal" density of the latter (that is to say, the number receptor cells per unit of length along a dimension of the matrix) is double the lineal density of the images; in other words, if one neglects the spacings between cells, which is a distance as short as possible, the sequence of the source images is twice the sequence of the cells. The number of cells in each direction of the receptor matrix is, however, greater than twice the number of sources in the corresponding directions of the receive board (a row and and a column more in the receptor matrix in FIG. 14) to prevent that a source image from overflowing the mosaic (receptor matrix) in spite of the positional deviations or geometric defects of the objective. If, in a given direction, the receive board contains S sources connected to the input links, the number of cells in the same direction of the receptor matrix is greater than 2S. For example, for a square matrix of $S^2$ sources in the transmit board there corresponds a square matrix having more than $4S^2$ cells in the receptor mosaic of each receiver. In the case of FIG. 14, the function of the computer control 213 (FIG. 6) involves switching to the output channel of the receiver considered the cell or cells located at the intersection of the row (or the two rows) and the column (or the two columns) where the image of the source designated by the address register and recognition unit 214 is formed. Using the computer moreover permits compensation of the geometric aberrations of the objective by appropriate circuits; this, in consequence, simplifies recognition unit 214.

It is be noted that in the solution described above, there is no bi-univoqual correspodence between the sources of the transmit board and the cells of each receiver. The number of cells in one or the other main directions of the receptor mosaic can be made greater than 2S.

Advantageously, when the switching device is part of an automatic switching unit, such as the unit in FIG. 6, it is possible to assign, respectively, to the reference sources of the transmit board and the reference cells of each receiver the functions of operative transmitters and receivers (respectively 110N and n in FIG. 6).

Although the examples of embodiment described above utilize, by way of opto-electronic transducers employed as light sources in the transmit board, light emitting diodes, it is obviously possible to utilize other types of transducers. The latter may for example be laser-effect diodes or light modulators controlled by incoming electrical signals to transmit and modulate the flux of a constant-intensity light source.

The preceding examples show how the dispositions of the invention apply to the aforecited type of switching devices in which each transmitter link element of the transmit board is a light source and each receiver link element of the receive board is formed by an assembly of photoreceptor cells. In the following it is be shown how these dispositions apply to switching devices in which each receiver link element of the receive board is a receptor cell and each transmitter link element is formed by an assembly of light sources.

Figure 15:
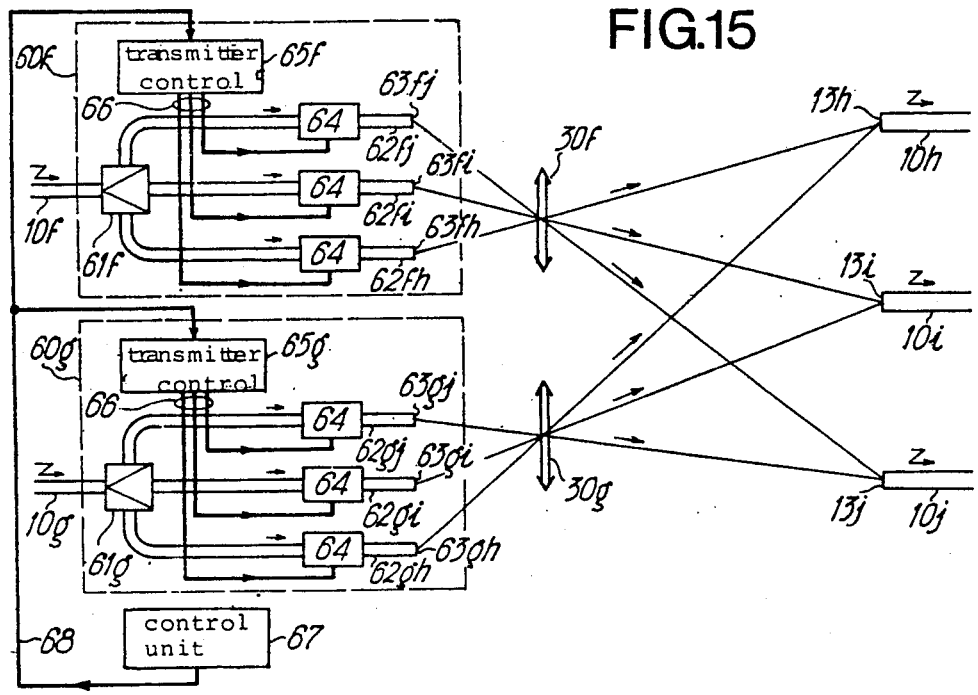
FIG. 15 is a block diagram of a second embodiment of the switching device of the aforementioned type to which the invention can be advantageously applied.

The switching device of FIG. 15 has N=2 light guides 10$f$ and 10$g$ (incoming links) and P=3 light guides 10$h$, 10$i$ and 10$j$ (outgoing links). A transmitter element 60$f$ comprises an optical divider 61$f$ which subdivides the light flux of guide 10$f$ into three components respectively transmitted by light guides 62$fh$, 62$fi$ and 62$fj$. A transmitter element 60$g$ comprises an optical divider or switch 61$g$ which subdivides the flux of guide 10$g$ into three components respectively transmitted by light guides 62$gh$, 62$gi$ and 62$gj$. An objective 30$f$ projects the images at the end of guides 63$fh$, 63$fi$ and 63$fj$ to the ends of 13$h$, 13$i$ and 13$j$ of guides 10$h$, 10$i$ and 10$j$. Ends 63$fh$, 63$fi$ and 63$fj$ are respectively optically conjugated with the extremities 13$h$, 13$i$ and 13$j$ Another objective 30$g$ projects the images at the ends of guides 63$gh$, 63$gi$ and 63$gj$ in the plane of the ends 13$h$, 13$i$ and 13$j$. Ends 63$fh$, 63$fi$ and 63$fj$ are respectively optically conjugated with the ends 13$h$, 13$i$ and 13$j$. Optionally, a light amplifier (not shown) is interposed in each light guide 10$h$, 10$i$ and 10$j$.

Along the length of each guide 63 there is interposed an optical switch 64 with electronic control (optical gate), optionally followed by a light amplifier (not shown). All of switches 64 of a particular transmitter are controlled by means of a transmitter control 65 over control links 66. A central control unit 67 transmits connecting instructions to the transmitter controls 65 over a common link 68. The control unit 67 is thus able to establish an optical link between any of the input guides 10$f$ and 10$g$ on one hand and any of the output guides 10$h$, 10$i$ and 10$j$ on the other. Accordingly, the ends of guides 63$fh$, 63$fi$ and 63$fj$ are effectively the light sources of the transmitter element of the transmit board corresponding to the incoming link 10$f$, while the ends of guides 63$gh$, 63$gi$ and 63$gj$ are the light sources of the transmit board corresponding to the input link 10$f$, and the ends of the guides 13$h$, 13$i$ and 13$j$ are the receiver elements of the receive board.

Figure 16:
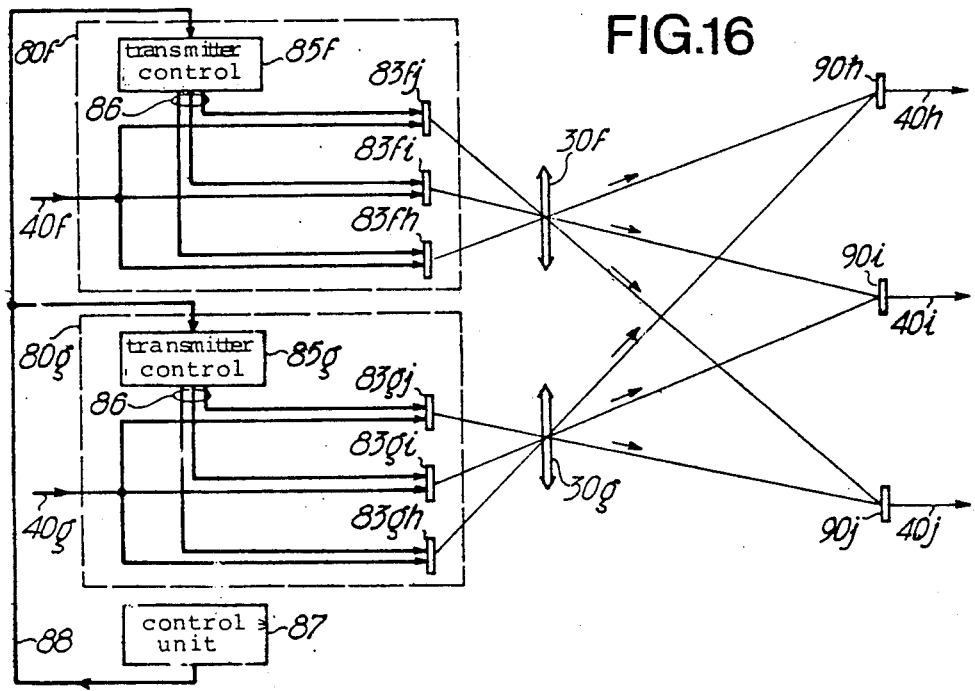
FIG. 16 is a variant of the diagram of FIG. 15.

In the embodiment of FIG. 16, the input links for transmitter elements 80$f$ and 80$g$, are respectively electrical conductors 40$f$ and 40$g$, respectively connected to drive three parallel opto-electronic transducers light emitting diodes, laser diodes, . . . ) 83$fh$, 83$fi$ and 83$fj$ (which constitute the light sources of the transmitter elements 80$f$ corresponding to the said conductor 40$f$), and three parallel opto-electronic transducers 83$gh$, 83$gi$ and 83$gj$ (which constitute the light sources of the transmitter element 80$g$ corresponding to the said conductor 40$g$). The output conductors 40$h$, 40$i$ and 40$j$ are respectively connected (optionally through an intervening amplifier, not shown) to be responsive to the outputs of three opto-electronic transducers (photodiodes) 90$h$, 90$i$ and 90$j$ which constitute the receiver elements of the receive board. The opto-electronic transducers 83 of a given link transmitter element 80 are controlled by a transmitter control 85 over control links 86. The objective 30$f$ optically conjugates the light sources 83$fh$, 83$fi$ and 83$fj$ with the photoreceptors 90$h$, 90$i$ and 90$j$, respectively, while the objective 30$g$ plays the same role with regard to the sources 83$gh$, 83$gi$ and 83$gj$.

The direct control of the light sources of a light transmitter (for example transmitted 60$f$ and 80$f$ in FIGS. 15 and 16) by the associated control 65$f$ or 85$f$ imposes a number P of control links 66 or 86. If P is high, it is advantageous to arrange the sources of each transmit board in a matrix configuration (that is to say, in rows and columns) in such a manner that the control of the source may be realized by means of two links, namely a row link and a column link; a selected row and column is at the intersection where the source is located. For example, P=10,000, the arrangement of the sources in a matrix of 100 rows and 100 columns permits the control of the sources by only 200 links.

Figure 17:
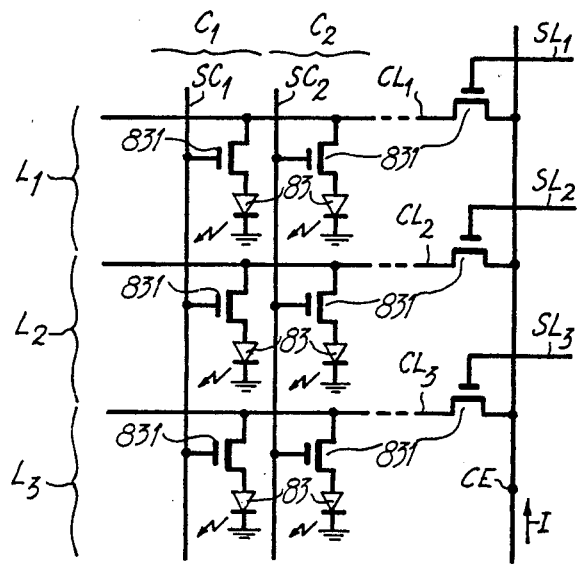
FIG. 17 is a partial electrical circuit diagram of a random-access integrated opto-electronic component which can be advantageously utilized as link emitter element in this second form of embodiment.

A light transmitter can thus be formed by a matrix of electroluminescent diodes FIG. 17 is a circuit diagram of an advantageous embodiment of the matrix electrical circuitry. Sources 83 (FIG. 16) are light emitting diodes identified by the intersections of rows L1, L2, L3, etc., . . . and columns C1, C2, C3, etc., . . . Each diode 83 of index pq (p being the index of a row and q the index of a column) is fed with an input signal delivered to a common input CE by means of two normally open circuited electronic switches 831 which, in the embodiment of FIG. 17, are field effect transistors. One of transistors 831 for a particular intersection of the row and column can be unblocked (i.e., the switch closed) by a voltage applied to the row selector control link SLp to connect the channel of rows CLp to the input CE. The other transistor 831 for the particular intersection can be unblocked by a voltage applied to the column selector control link SCq to connect the photodiode 83 of index pq to the row channel CLp. In an unillustrated variant, the matrix can be organized in such a manner that each diode is connected in series between a switch which connects the diode to a current input and another switch which connects it to a common earth.

Figure 18:
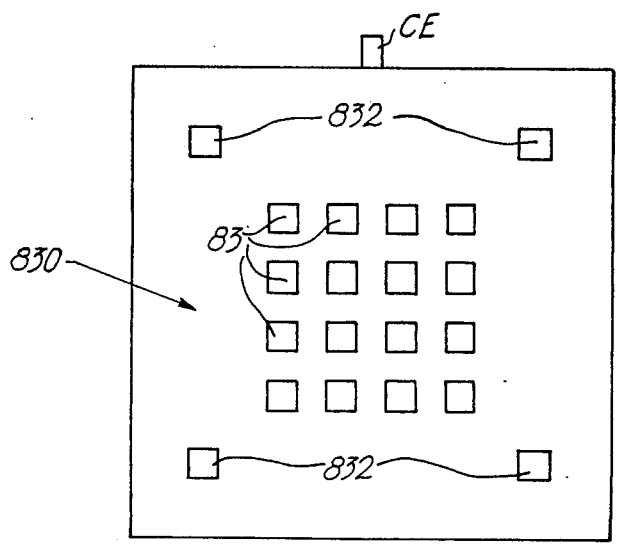
FIG. 18 is a schematic frontal view of the component.

Such random-access photodiode matrices can be advantageously realized in the form of integrated components; FIG. 18 is a front view of the emitter face of such an integrated component. In the central region of the face are located emitter zones of the electroluminescent diodes 83 arranged in a square natrix 830. The transmitter control is integrated into the component illustrated in FIG. 18, whereby the connections of rows SL and the column connections SC are not visible in the Figure. As seen later, the switching instructions can be advantageously transmitted to the transmitter control by optical means, for example by a control receiver element comprising one or several elementary receptor cells, 832. In FIG. 18, there are four such cells. This redundancy improves the operational safety. Elementary receptor cells 832 are disposed adjacent the four corners of the component, enabling them to be used for adjusting the position of the transmitter and of its optics relative to the receive board, at the expense of adding to the latter reference light sources.

Reference is now made to an electric circuit diagram of the transmitter control circuit integrated into the transmitter component shown in FIG. 18 to control the switching of the sources 83 (FIGS. 16 and 17), by electronc switches 831 (FIG. 17). It is assumed that in the transmitter element under consideration that sources 83 are formed as P=16 light emitting diodes, arrayed in four rows and four columns. It is also assumed that the transmitter element has a single control receptor cell 832 (FIG. 18) receiving the luminous address signals. The register circuit 700 converts the serial signals transmitted by the cell 832 over the link 833 into a parallel, four bit word. The parallel word derived from circuit 700 is stored in four stage register 750. The bits of the two most significant bits stored in register 750 are transmitted to a row bus 760, while the two least significant bits of register 750 are supplied to a column bus 770. The address signals of busses 760 and 770 are translated into signals transmitted over the line and column selection controls SLp (p=1, 2, 3 or 4) and SCq (q=1, 2, 3 or 4), by conventional decoding logic networks 780, illustrated in FIG. 19 by only a functional circuit diagram. The connection CE conveys to photodiodes 83 of matrix 830 the signals to be transmitted. To enable the transmitter of FIG. 19 to be used as an automatic switching unit, there is provided an end of communication detector circuit 710, having an input connected to the link CE. On receiving an end of communication signal, the circuit 710 transmits a control signal to the re-initialization circuit 720, which responds by deriving a pulse that is delivered over a link 721, that to the zero-reset input 751 of register 750, and to the control input of a generator 752 which delivers to the link CE an end of communication pulse. In this manner, all circuits revert to their initial states.

Figure 19:
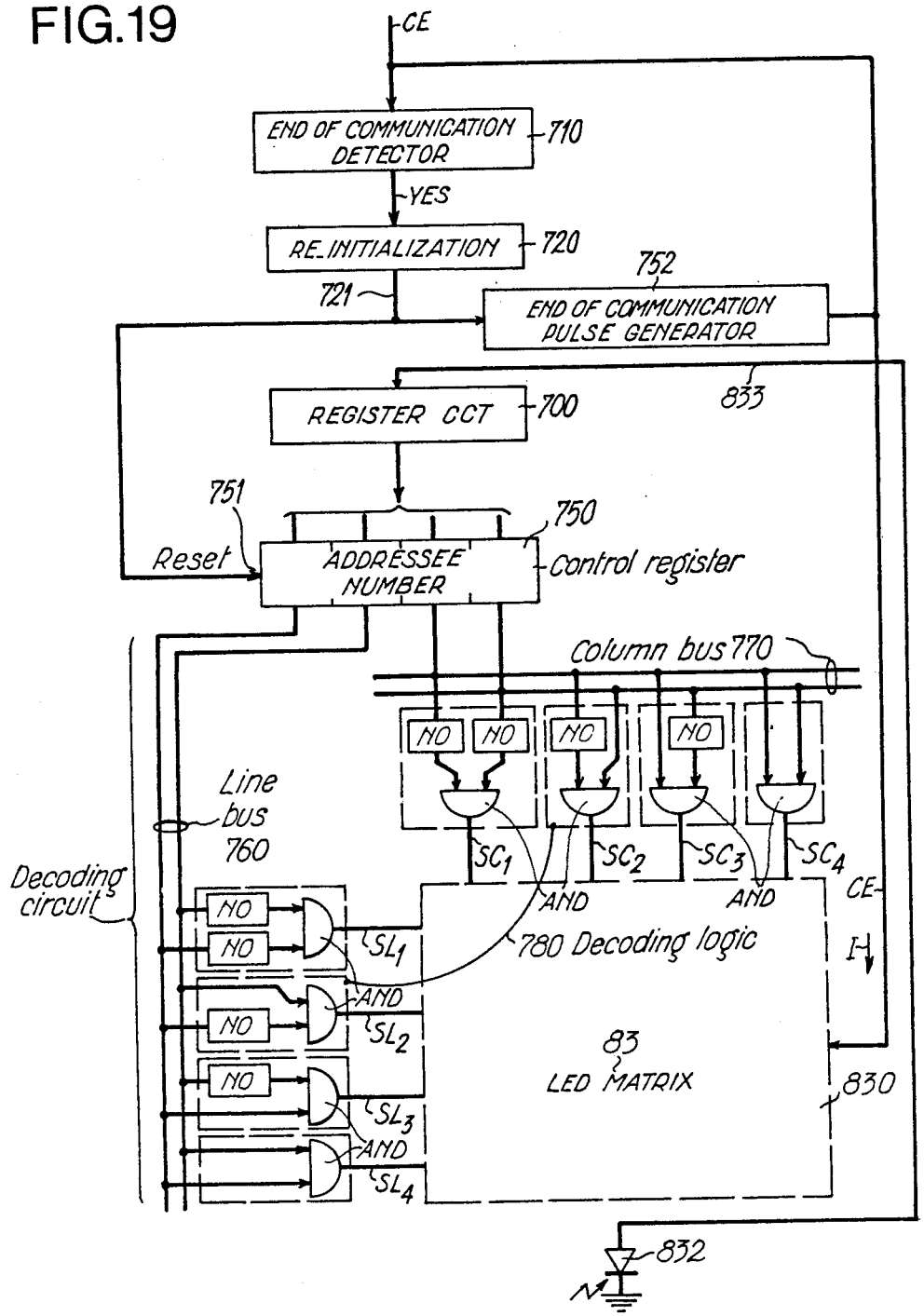
FIG. 19 is an electrical diagram of the control circuit integrated with this component.
Figure 20:
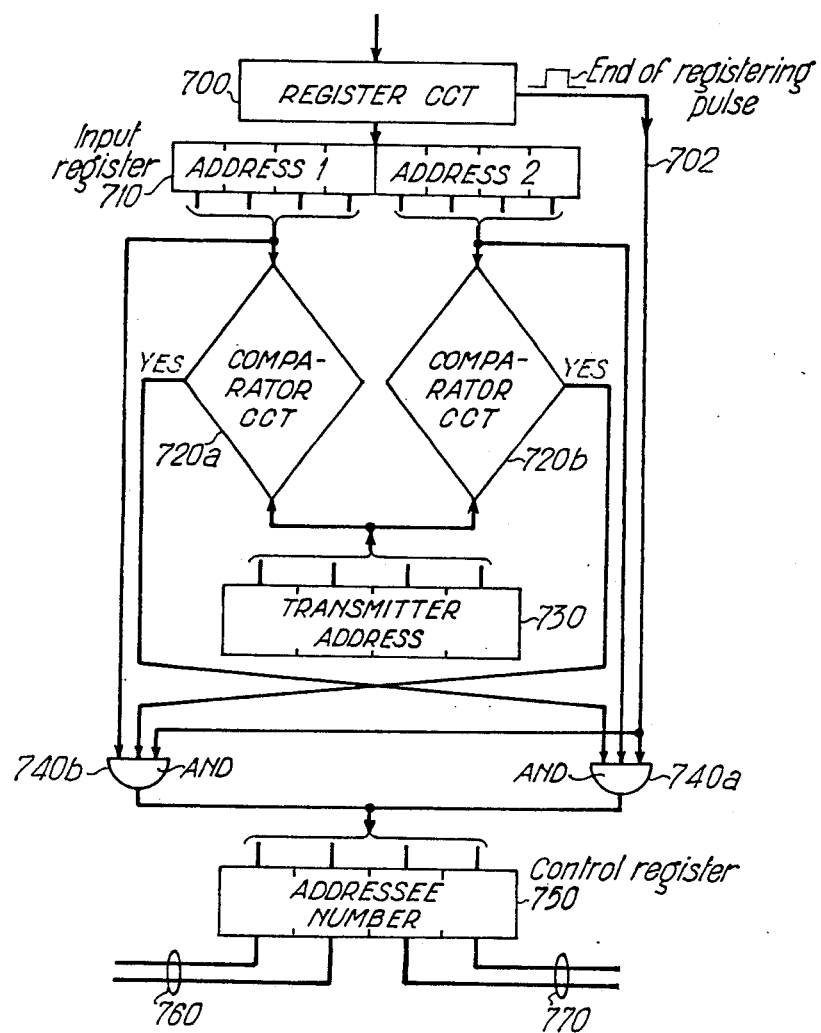
FIG. 20 is an electrical diagram of an address recognition circuit advantageously integrated with this component to complete the circuit in FIG. 19.

FIG. 20 is a diagram of a supplementary address recognition circuit advantageously added to the assembly of FIG. 19 to enable the transmitter control circuit to recognize whether the switching instruction which it receives over the link CE is actually addressed to it. Register circuit 700 and control register 750 are illustrated in FIG. 20. The instruction received is formed by a first and second addresses, which respectively designate an input link and an output link to be connected to the input link. Instead of being transmitted directly to the register 750, the parallel bits of each word delivered by the register circuit 700 are transmitted to an input register 710 which stores it. Comparator circuits 720a and 720b respectively compare the first and second addresses of the pair with the address of the transmitter in question, initially stored in a transmitter address memory 730. If, at the end of registering, signalled by a pulse transmitted by the register circuit 700 over a link 702, one of the comparator circuits 720a and 720b recognizes in one of the addresses as that of the transmitter to which it belongs, that comparator causes the other address to be stored in the control register 750 by way of an associated AND gate 740a or 740b. This other address is supplied to busses 760 and 770 (FIG. 19) to cause the switching of the corresponding light source. To interrupt a pre-established connection between an input link A and an output link B on one hand, and an input link B and an output link A on the other hand, two connection instructions "addresses A,X" and "addresses B,X" are supplied to the circuit of FIG. 20; X in this example is the address of a so-called "functional" receiver, described later (receiver 97, FIG. 21) which has the task of supervising the status of the incoming links and of transmitting the service signals originating in these incoming links.

Figure 21:
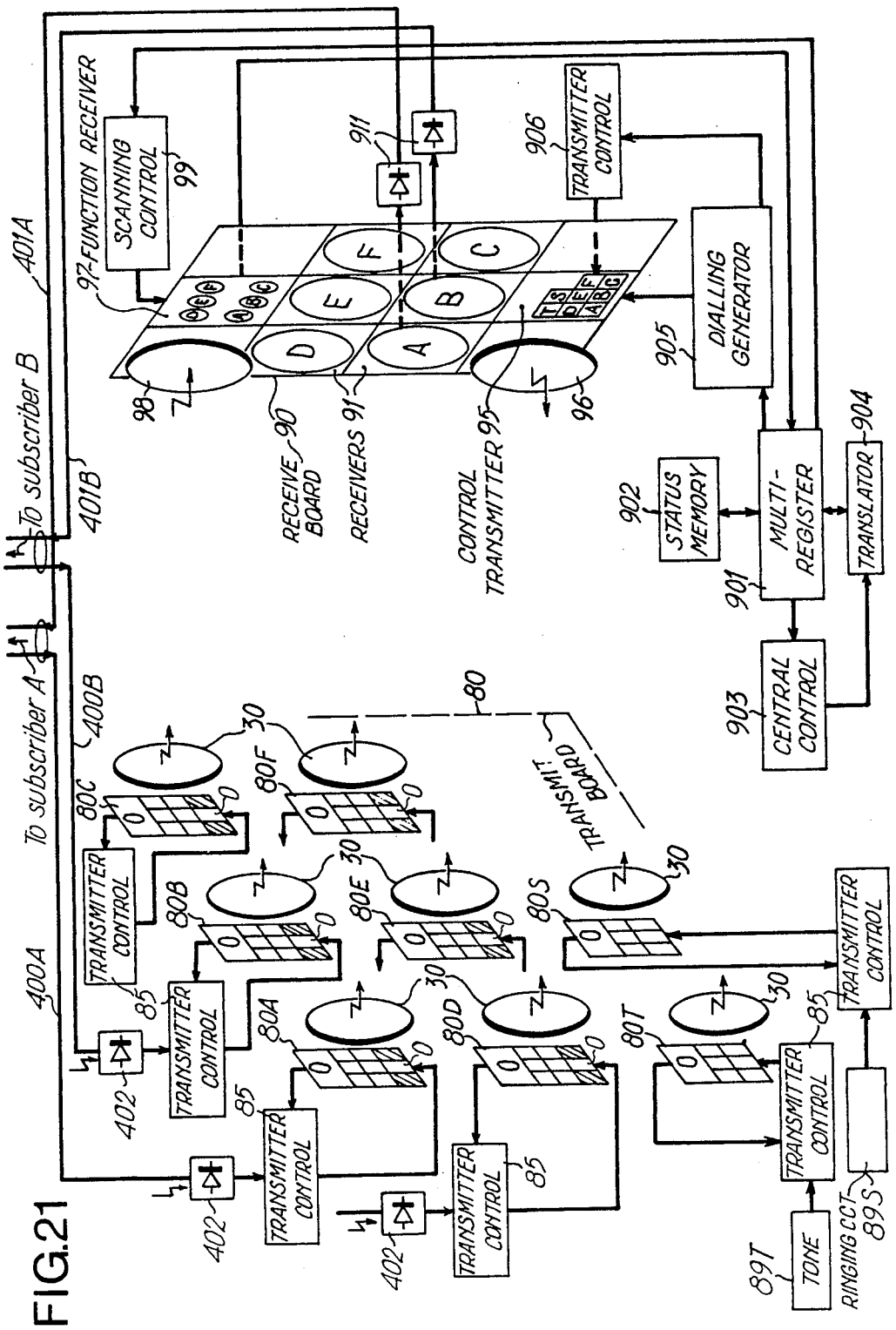
FIG. 21 is a diagram, partly in perspective, partly in the form of a block diagram, of a local automatic telephone switching unit comprising a switching device embodied according to the second embodiment and in accordance with the invention.
Figure 22:
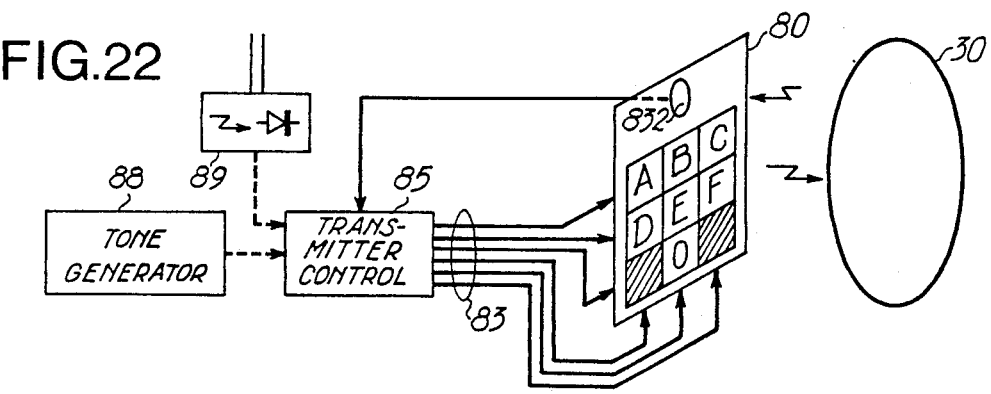
FIG. 22 is a schematic perspective view of a link emitter element of the emitter board of the automatic switching unit in FIG. 21.
Figure 23:
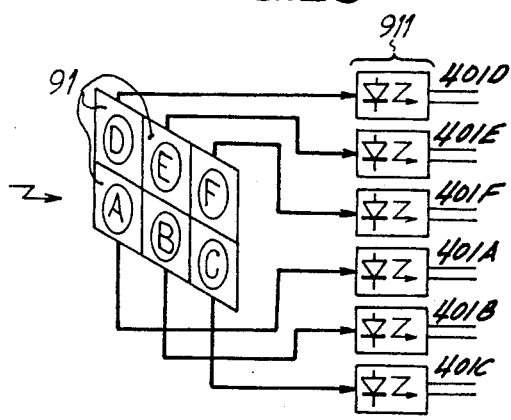
FIG. 23 is a schematic perspective view of a receiver link element of the receive board of the said automatic switching unit.

FIGS. 21, 22 and 23 are illustrations of a second embodiment of an automatic switching unit comprising a switching device according to the invention.

FIG. 21 is the general layout of an automatic switching unit designed for the exchange of communications between subscribers A, B, etc., connected by input fiber optic (light guide) links 400A, 400B, etc., and output fiber optic links 401A, 401B, etc.,. The transmit board 80 includes (1) N link transmitter elements 80A, 80B, .. . 80F, (2) functional transmitters 80S for transmitting call, i.e., ringing signals and (3) functional transmittrs 80T for transmitting tone signals, e.g., dialing and ringing tones; at least one tansmitter 80T is provided for each type of tone to be generated. To simplify FIG. 21, only a single functional transmitter 80S and a single functional transmitter 80T are shown. The optical signals transmitted by the incoming links 400A, 400B, etc., are converted by means of transducers 402 (for example photodiodes) into electrical signals which respectively activate the subscriber transmitters 80A, 80B, etc., The receive board 90 simultaneously receives the real images derived from all the transmitters of board 80 via a plurality of objectives 30 respectively associated with the transmitters. Each transmitter element 80A, 80B, .. . 80F, 80S and 80T is formed, as shown in FIG. 22, by an array of N light sources (light emitting diodes) A, B, . . . F. The link transmitter elements 80A, 80B, . . . 80F also have at least one supplementary, functional light source O, the role of which is explained later. As shown in FIG. 23, the receive board 90 comprises an array of N link receiver elements 91 (for example photodiodes), also referenced A, B, . . . F, having outputs respectively connected to the outgoing subscriber links 401A, 401B, . . . 401F by amplifying transducers 911 which are, for example, laser diodes.

The positions of the sources A, B, . . . F of each transmitter element 80 and the receiver elements A, B, . . . F of the bord 90 are optically conjugated by means of the objective 30 assigned to the said transmitter element in such a manner, that a specific receiver element A,B, . . . F of board 90 receives the image of each source labelled by the same reference A,B, . . . F in all the transmitters 80A, 80B, . . . 80F, 80S, 80T. Thus, for example, light from source B of transmitter element 80A is incident on the receiver element B of the board 90 is illuminated to establish an univoqual optical link from subscriber A to subscriber B. Light from source A of the transmitter element 80B is incident on the receiver element A of board 90 to establish an unequivocal optical link from subscriber B to subscriber A.

Each transmitter element 80 has its own control 85 for transmitting to a specific light source of said transmitter element 80 such that;

(a) if the source is a link transmitter element (80A, 80B, . . . 80F), the signal delivered by the corresponding subscriber link via the transducer 402 is assigned to said link, or, (b) if the source is a functional transmitter element (80S, 80T, respectively), the signal is delivered by a call signal generator 89S or by a tone signal generator 89T.

Figure 25:
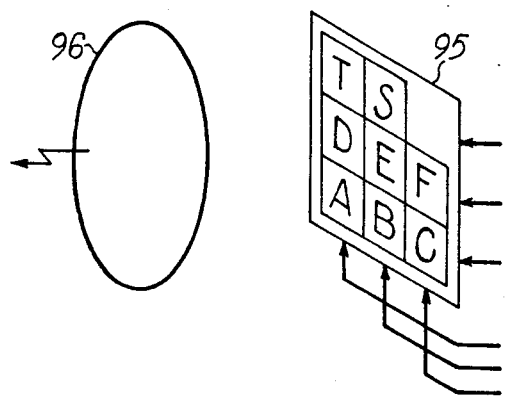
FIG. 25 is a schematic perspective view of a control emitter element included in the receive board.

The transmitter control 85 of each transmitter element registers and then executes (see FIG. 22) the connect instructions retransmitted by the control receptor cell (photodiode) 832. Cell 832 transforms the optical signals supplied to it into electrical signals coupled to transmitter control element 95. Element 95 (FIGS. 21 and 25) has as many light sources A,B, . . . F,S,T as there are transmitter elements 80. Sources A, B, . . . S and T of elements 95 occupy positions in the plane of the transmitter element 95 which are homothetical with those of the transmitter elements 80A, 80B . . . 80S and 80T in the plane of the transmit board 80 so that an optical system 96, cooperating with the objectives 30, can project: the image of source A on the cell 832 (FIG. 22) of the transmitter element 80A, the image of the source B on the cell 832 of transmitter element 80B, etc. There is thus established an equal number of unequivocal optical links between the sources and the cells. The light signals delivered by the sources are the address signals of the receiver elements of board 90. To be more precise, a luminous address signal transmitted by a specific source of the transmitter element 95 and received by receptor cell 832 of the transmitter element 80 is converted into an electrical address signal by element 80. The address signal activates the corresponding transmitter element 85 so it transmits the electrical signals derived by one of transducer 402, generator 88S or generator 80T associated with the transmitter element; the electrical signal is coupled to the source of said transmitter element designated by the said electrical address signal.

Advantageously, the sources of each transmitter element 80, the receptor cell 832 of element 80 and its associated control 85 are integrated into a single component, of the type already described with reference to FIGS. 17, 18, 19 and 20.

To form an automatic switching unit, it suffices to add to the switching device shown in FIG. 21 at least one multi-register 901 which is associated with a status memory 902. Instructions stored in register 901 for connections to the control transmitter element 95 are transmitted by a dialing signal generator 905 and a transmitter control 906. Register 901 is connected to a central control unit 903 and to a translator 904. This multi-register 901 stores the service signals transmitted by the transmitter elements 80 and translated by the functional receiver element 97 added to the board 90. These signals enable register 901 to:

(a) detect the events occurring on a link (new call, receiver replaced) by comparing the present state of the link with the previous link state stored in the status memory 902, and (b) register the dialing signals transmitted by the subscribers.

Therefore, at the disposal of multi-register 901 therefore is necessary information to establish or to cut a communication. to this end, register 901 can:

(a) interrogate the translator 904 to learn the correspondence between a dialed number and the corresponding address A, B, . . . F, (b) transmit switching instructions via the control transmitter element 95 and the receptor cells 832 to any one of the transmitter elements 80 to connect elements 80 to any of receivers 91 optically, (c) and send call signals from transmitter element 80S or tone signals from transmitter element 80T to any one of the receiver elements of board 90, by way of the sources S and T of the control transmitter element 95.

In addition, the multi-register 901 supplies information to the central control 903 to enable control 903, in particular, to monitor the functioning of the automatic switching unit and to debit a caller at the end of a communication. The central control unit 903 therefore does not intervene in the real-time operations of establishing and interrupting communications.

In the absence of the functional receiver element 97, the device signals originating in an input link are transmitted directly to the multi-register 901 by electrical links connected, for example, to the outputs of transducers 402. However, the functional receiver element 97 makes it possible to dispense with these electrical links by substituting optical links exploiting the signals delivered by the 0 sources respectively disposed in a transmitter element of each link.

Figure 24:
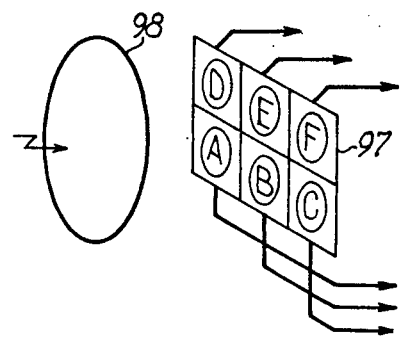
FIG. 24 is a schematical perspective view of a functional receiver element included in the receive board.

To this end, functional receiver element 97 (FIG. 24) comprises an array of elementary receptor cells, A, B, . . . F homothetical with the array of the transmitter elements 80A, 80B, . . . 80F. The optical system forms on each elementary receptor cell the image of the corresponding objective 30, which forms the image of the 0 source of its transmitter element on the optic 98. In this manner, the objective 98 and the objectives 30 establish an unequivocal optical communication between the 0 source of each link transmitter element and the elementary receptor cell corresponding thereto of the functional receiver element 97. The latter is advantageous formed by a photodiode matrix, either of CCD-type sequential access or with random access. At a given instant, the multi-register 901 can access only one of the receptor cells of the functional receiver element 97. Register 701 explores sequentially each of the cells by means of a control unit 99 (FIG. 21). The control 99 is advantageously integrated with the functional receiver element 97. Such a receiver element and its integrated control have already been described with reference to FIGS. 4, 5 and 6.

As long as no particular address signal is delivered by the control transmitter element 95 to the functional receptor cell 832 (FIG. 22) of a link transmitter element 80A, 80B, . . . 80F, the control 85 associated with said transmitter element holds the 0 source of the latter in connection with the output of the associated transducer 402 which delivers to the control electrical signals translating the optical signals transmitted by the incoming optical link 400A, 400B, . . . 400F. The functional receiver 97 therefore scans one by one, at the cyclical rate imposed by the multi-register 901, the 0 sources of all the link transmitter elements, enabling the multi-register to detect, by referring to the status memory 902, any change in activity of each 0 source occurring between two scanning cycles.

The operation of the automatic switching unit of FIG. 21 for a communication in progress, wherein subscriber A is the caller and subscriber B is the addressee is as follows:

(a) subscriber A lifts his receiver, causing the input of the transmitter element 80A to be switched to the 0 source of element 80Aa, whereby the 0 source is activated to illuminate the cell A of the functional receiver element 97;

(b) the multi-resister 901 detects in the course of its scanning operation, the status change of the said receptor cell A and causes one of the sources T (corresponding to a dialing tone generator) of the control transmitter element 95 of the receive board 90 to transmit the address of A; the control 85 of the transmitter element 80T of the transmit board 80 then switches the input of board 80 to its source A, thus causing a dialing tone signal generated by the generator 88T to be sent in the direction of the receiver element A of receiver board 90;

(c) having received the signal over the link 20A, the subscriber A dials the number of B which the transmitter element 80A, still switched to its 0 source transmits to the multi-register 901 via the functional receiver element 97; on receiving the first dialling digit, the multi-register 901 disconnects the source A from the transmitter element 80T and consequently interrupts the sending of the dialing tone signal; the disconnection is via the same source T of the control transmitter element 95 and the receptor cell of the transmitter element 80T;

(d) the multi-register 901 stores the number of B dialed by A, interrogates the translator 904 to obtain the address corresponding to number B, interrogates the status memory 902 to check that B is free and, if this is the case, causes a ringing control signal to the address of B to be transmitted by source S of the control transmitter element 95 (corresponding to a free transmitter element 80S) and the receptor cell of this transmitter element 80S; the input of element 80S is switched to its source B which illuminates the receiver element B of receive board 90 by a modulated ringing signal; at the same time, register 901 transmits to subscriber A an answer tone signal by way of the source T of the transmitter element of control 95 (corresponding to a ringing tone transmitter element) and the receptor cell of transmitter element 80T; the input of element 80T is switched to its source A which illuminates the receiver element A of the receive board 90;

(e) when subscriber B lifts the receiver, the 0 source of its transmitter element 80B illuminates the receptor cell B of the functional receiver element 97; the multi-register 901 responds to the change of status of said source to transmit the address of B to the receptor cell 832 (FIG. 22) of the transmitter element 80A with the control 81 that switches; the transmission is provided via the source A of the control transmitter element 95 switches; after the address has been stored in register 901, the input thereof to source B of control transmitter 95 thus establishes a connection between the link 400A and the line 401B via the receiver element B of receive board 90; the multi-register 901 also causes, through the source B of the control transmitter element 95, the transmission of the address of A to the receptor cell 832 of transmitter element 80B and consequently the switching of the input of element 80B to its source A, thus establishing a connection between the link 400B and the link 401A; the two subscribers A and B are thus linked in communication; the multi-register 901 transmits to the central control unit 903 the information necessary to monitor the functioning of the unit as a whole and to meter the caller;

(f) lastly, when one of the subscribers, for example B, hangs up, the control 85 of transmitter element 80B detects the interruption and switches the input of said element to its 0 source so element 80B transmits an end of communication pulse; during its scanning operation, the multi-register 901 detects this pulse through the receptor cell B of the functional receiver element 97; the multi-register then sends, through the source A of the control transmitter element 95, a re-initialization signal (for example a zero address) to the receptor cell 832 of the transmitter element 80A having a control 81 that cuts the connection between the source B and the associated transducer 402 and switches transducer 402 to the 0 source; in the present option, the multi-register 901 switches an end of communication tone generator 88T, or an engaged tone or a dialing tone again, to the receiver element of subscriber A until the subscriber A replaces his receiver or dials a new number.

The preceding explanation enables any one of ordinary skill to compose the circuits and components which participate in the formation of the automatic switching unit shown in FIG. 21. Each transmitter element control 81, e.g., the embodiment of FIG. 19 comprises a register (e.g., register 750 in FIG. 19) for storing the address signal received by the receptor cell 832 (FIG. 22) and decoding logic 780 enabling the input channel CE to be switched to the source A,B, . . . F corresponding to the stored address. The control of FIG. 9 comprises an end of communication detection circuit 752 which reinitializes register 750 (introduction of the address of source 0) and the sends over the channel CE an end of communication pulse to the functional receiver 97 of the multi-register 901 (FIG. 21), after detecting the disappearance of information signals on the input channel CE.

The introduction into the transmitter controls of the transmit board, as shown in FIG. 19 of address recognition circuits, such as those in FIG. 20, makes it possible to simplify the structure of the control transmitter element 95 of the receive board 90 (FIG. 21). A transmitter control thus equipped is capable of recognizing whether the address of its transmitter element is part of an address pair. It then suffices to have the control transmitter element 95 to comprise, instead of a plurality of light sources A,B, . . . F,S,T a single, non-directive light source, that is a source illuminates the whole set of transmitters of the transmit board 80. This source transmits, under the control of the dialing generator 905, signals representing address pairs (transmitter-receiver or subscriber A—subscriber B). The transmitter element which recognizes its own address in one of the addresses of said pair by means of its receptor cell 82 and its control 85 then switches the appropriate source to retransmit the signals which it receives in the direction of the receiver element 91 corresponding to the other address.

To facilitate the description of FIG. 21, in the latter only a single tone signal transmitter element 80T and a single ringing signal transmitter 80S are show. In fact, diverse variants can be visualized; in particular:

(a) a single generator 89T or 89S, specialised in the particular tone which it emits permanently, can be associated with several transmitter elements 80T or 80S, each of which serves a given subscriber (that is to say a receiver element 91 of the board 90), the number of such transmitter elements being sufficient to reduce the risk of jamming;

(b) or a single generator 89T or 89S can be associated with one or several transmitter elements 80T or 80S, each capable of serving simultaneously several receiver elements 91.

The variant (b) can be operated:

(1) either by switching simultaneously several sources of the transmitter element 80T or 80S considered to be the input channel CE of the said transmitter element; in this case the switching circuit diagram is slightly more complex than that of FIG. 19, because it requires utilization of memory connection nodes which are the equivalent of the holding relays employed in electromechanical switchgear; or (2) by transmitting one by one tone signal samples towards each of the affected receiver elements, effecting temporal switching of input channel CE of one of the transmitter elements 80T or 80S to the sources which correspond to these receiver elements.

In order to obtain, by means of the objectives 30, a satisfactory optical conjugation between the sources of the transmitter elements of the transmit board 80 and the receiver elements 91 of the receive board 90, it is necessary to locate with precision such of the transmitter elements and its associated objective 30 relative to the receive board. This problem can be resolved by applying to the optical couple constituted by each transmitter element and the associated objective the structures already described with reference to FIGS. 7, 8 . . . 12 and 13 for positioning of the selective opto-electronic receiver elements and the associated objectives. Accordingly, the following dispositions can be advantageously applied:

(a) to mount each transmitter element and the associated objective to constitute a sighting unit, (b) to associate with each sighting unit adjustment means making it possible to adjust the relative positions of the transmitter element and its objective relative to the receive board, (c) to make integral with the receive board 90 at least one additional transmitter element (light source) called "reference source" and with each transmitter element at least one receiver element (elementary receptor cell) called "reference cell" (this function can be fulfilled by the cells 832) occupying in the said transmitter element a position optically conjugated with the position of the reference source in the receive board, in such a manner that adjusting the sighting unit position can be adjusted by activating adjusting means to obtain a reference cell output signal having a maximum level, (d) lastly, to equip each sighting unit with automatic control means for the adjusting means acting in depence of the level of the output signal of the reference cell.

With regard to the arrangement (c), it is possible to use as reference sources the sources of the control transmitter element 95, in the option where the latter is not directional.

According to the invention, it is nevertheless possible, at the expense of a certain complication of the transmitter elements of the board 80 and of their control electronics, to avoid the use of manual or automatic devices for correcting the position of the transmitter elements. This result is obtained by providing the control of each transmitter element of the board 80 with means for determining the source or sources having an image propagating through the objective 30 associated therewith is formed on a specific receiver. The address of these sources is calculated as a function of the position occupied relative to a plurality of reference receptor cells integral with the transmitter element and advantageously integrated within the latter. The address calculation is made in response to the trace of at least one reference beam delivered by at least one transmitter element (source) of a reference secured to the receive board.

Figure 26:
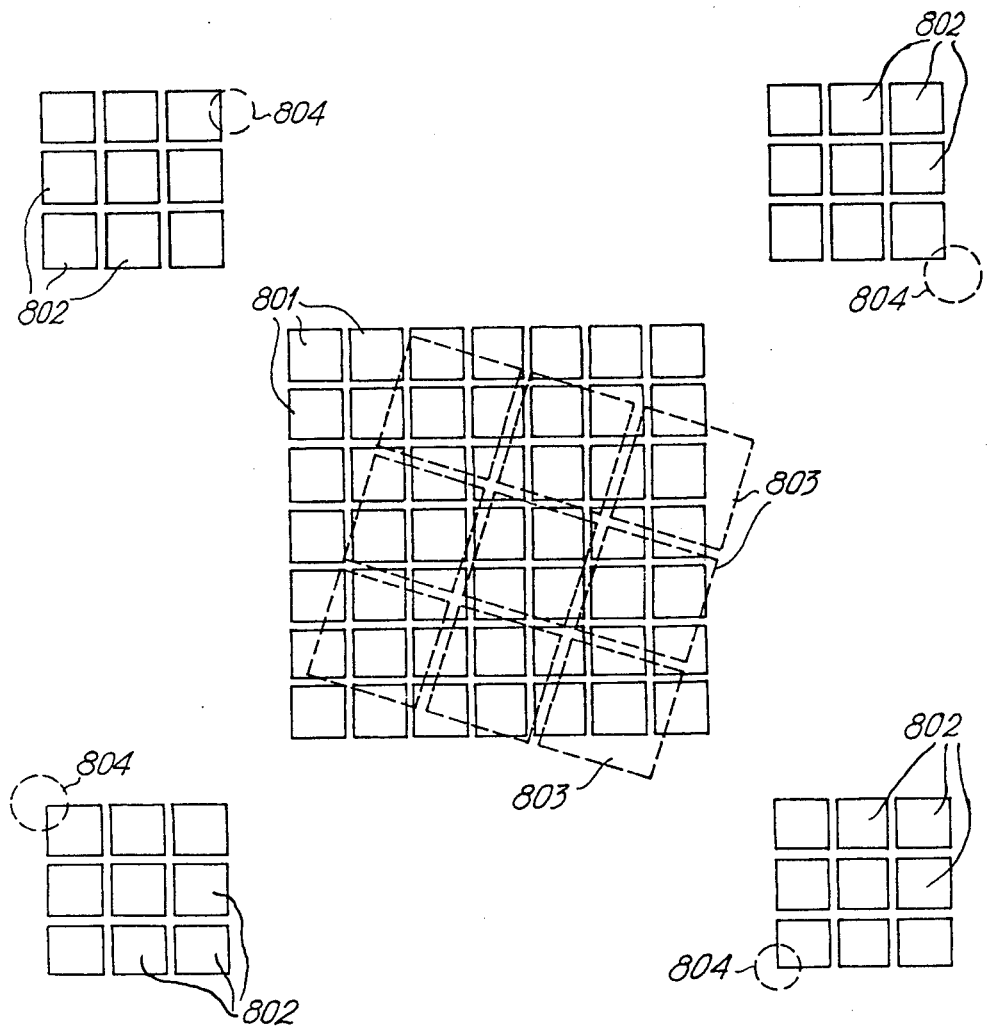
FIG. 26 is a schematic frontal view of a link emitter element according to the invention, wherein elementary light sources or emitter cells enable elimination means for controlling the position of the emitter element.

To this end, refer to FIG. 26, an illustration of a simple embodiment of the transmitter elements of the transmit board 80 making possible the application of this structure. The transmitter element of FIG. 26 comprises a source mosaic 801 having dimensions and a position such that the image thereof cast by the associated objective covers the all of the receive board surface. The transmitter also comprises four receptor cell mosaics 802 "reference mosaics"), which receive the images of four reference sources disposed on the receive board. In the plane of FIG. 26, that is in the plane of the transmit board, are shown, on one hand, the images 803 which the objective associated with the transmitter element casts of the receiver elements of the receive board also illustrated are images 804 which the same objective projects from the reference sources of the receive board. In the example illustrated in FIG. 26, the source mosaic of the transmitter element is a square matrix of 7×7 sources 801, while the receive board comprises a square matrix of 3×3 receptor cells having outputs which are respectively connected to an equal number of outgoing links and whose images 803 themselves present a square matrix of 3×3 images. The lineal numerical density of the sources 801 of the transmit board (in other words, the number of sources per unit of length in the two dimensions of the plane of the transmitter) is therefore greater than twoce the lineal density of the images 803 of the receiver elements of the receive board. With regard to the reference mosaics of the transmit board, these are each constituted of a 3×3 matrix of receptor cells of reference 802, and disposed around the mosaic sources 801, each of these matrices of reference receiving the image 804 of a reference source occupying a homologous position in the receive board.

The transmitter control 85 (FIG. 21) associated with the transmitter element of FIG. 26 comprises a computer circuit capable of supplying from indications derived from the reference receptor cells 802, that is, from the position of those cells which receive the images 804 of the reference sources of the receive board, the address of the sources 801 of the board whose images are cast entirely or partly on a receiver element of specific address on the receive board and only on this receiver element; thus, with reference to FIG. 26, the address of the sources 801 of the transmit board coincides totality or partly with the single image 803 of the said designated receiver element. In other words, the computer circuit (which need not be described because its realization is obvious to those skilled in the art) determines, from the address signals delivered, for example, by the control transmitter 95 (FIG. 21) of the receive board and from the addresses of the reference cells 802 on which the images 804 of the reference sources of the receive board are formed, the address or addresses of those sources 801 of the transmitter element in question to be switched to the corresponding incoming link to transmit the signals of the said link to to a receiver element of designated address of the receiver board, and only to this receiver element. Given the ratio indicated above between the lineal density of the sources 801 and that of the images 803 (in other words, between the lineal density of the images of sources 801 on the receive board and the lineal density of the receiver elements of the latter), there is in fact always at least one source 801 whose image reaches any receiver element of the receive board and reaches only the said receiver element without overflowing to the adjacent receiver elements. Crosstalk is thus avoided.

In the structure described above, the prior art bi-unequivocal correspodence between the sources of each transmitter element of the transmit board and the receiver elements of the receive board has been eliminated. Also, the described structure enables elimination of all positional adjustment devices for the transmitter elements and their objectives relative to the receive board, and also permits, because a computer circuit included in each transmitter control, compensation for the geometric aberrations of the objectives. This simplifies the structure and provides for compensation of the image deformation which occurs as the image of the transmitter elements is removed from the axis of the receive board.

The control transmitter 95 of the receive board can, also be formed similarly to the transmitter elements of the transmit board 80; that is transmitter 95 can comprise a mosaic of transmitter cells, wherein the number of cells is greater than the number of transmitter elements 80; also at least one mosaic of reference receptor cells and a computer circuit can be included in board 80. In this case, reference sources are added to the transmit board 80 and the computer circuit makes it possible to determine the position of the control transmitter element 95 in accordance with the position within the mosaics of those reference cells which receive the images of the reference sources. The same disposition of principle can be adopted for the embodiment of the functional receiver element 97, in accordance with the solution already described with reference to FIG. 14.

The operating and positional control means of the transmitter elements 80 so far described employ optical links which require, in each of the said transmitter elements, the presence of transmitter cells 83 (FIG. 18) and receptor cells 832 and 85 (FIGS. 18, 22, 26). These embodiments are particularly advantageous if the employed technology allows integration of the emitter cells, the photoreceptor cells and a control logic into a single component. Should this not be the case, it may be found preferable to use, for the transmission of control instructions between a multi-register or a control unit on one hand and the transmitter elements 80 on the other, a common electrical link such as the link 68 or 88 in FIGS. 15 and 16. A control instruction is then formed, for example, of an address pair (address of caller, address of addressee). In this case, it then becomes necessary to consider structures for the control of the position of transmitters 80 different from the one described. An advantageous solution in such a case involves replacing the reference cells 82 (FIG. 18) of each transmitter element with reference sources. To these reference sources there correspond in the receive board receptor mosaics analogous to mosaics 802 found in FIG. 26. The appropriate scanning circuits transmit the indications enabling the cells of these mosaics of receptors reached by the light flux of the reference sources of the transmitter to be located and to deduce therefrom (for example by means of a computer) the magnitude of adjustments or corrections to be effected. In this solution of positional control of a transmitter element there is employed, contrary to the solution employing optical links, means common to the entirety of the transmitter elements and comprising reference mosaics and scanning circuits located within the receive board. It is impossible to effect by these means the positional control of more than one transmitter element at the same time. In consequence, the control of the set of transmitter elements as a whole must be carried out sequentially, either at the time of assembly or, if there are slow deviations to be corrected, in a constantly repeating manner during operation (dynamic control). It is then necessary to provide means for making it possible to illuminate separately the reference sources or source groups assigned to each transmitter element in order that the positional control of a transmitter element not be hindered by the light of reference sources of other transmitter elements. In the following, several embodiments of such means are described, firstly in the case of a manual adjustment (installation and maintenance) then in the case of an automatic adjustment (dynamic control).

The operator assigned to the task of manual adjustment must illuminate one by one the reference sources or source groups associated with the transmitter elements. Each transmitter element comprises a source interruptor switch making it possible to supply one by one each source or source group. It is also possible to provide means to convey over the common link (links 68 and 88 in FIGS. 15 and 16) the switching control instructions, and instructions for igniting of the reference sources delivered by an element of the central control unit 67 or 87.

In the case of automatic adjustment by means of devices respectively associated with each transmitter element, the central control 67 or 87 may comprise means for delivering, sequentially and/or as required, and over the common link 08 or 88, instructions for igniting of reference sources of designated transmitter elements and position signals which are adjustment control signals developed from the data delivered by the positional control circuits of the receive board.

However, when the switching device according to the invention utilizes transmitter elements with source mosaics such as those described with reference to FIG. 26, in order to dispense with the means for positional control, the position signals are address computation signals which must be delivered to the transmitter elements and may not be adjustment control signals. Advantageously, the position control procedure can be supervised by the central control unit 67 or 87 (FIGS. 15 and 16). Transmission of the ignition instructions for the reference sources is controlled by the central control unit. The ignition instructions are delivered over the common link 68 or 88, as previously seen; however, the computational address signals can be delivered in two different ways. In the first, the functions of address storage and address computation are decentralized. The position control circuits of the transmit board communicate the location data to the central control unit which deduces from these data the address computation parameters. The control unit transmits the address computation parameters to the transmitter element controlled by way of the common link 68 or 88. Each of these transmitter elements is provided with means for registering these computational parameters which enable it, during the establishment of a communication, to deduce from the address of the receiver element of its correspondent the addresses of the source or sources whose image is formed on the said receiver element.

In the second variant, the address storage functions and the address computation functions are centralized. The position control circuits of the receive board communicate the position signals to the control unit, which deduces therefrom the address computation parameters (the same as in the first variant); however the address computation parameters are stored in of the central control unit in a memory called "address translation memory". When, during the establishment of a communication, it is necessary to connect a link transmitter element A to a receiver element of the link B, the central control unit (or again the central element having this task; which is a multi-register as in the examples already considered), transmits to the transmitter element A, over the common link 68 or 88, the address computed from the address of the receiver element B. The address is computed by using the computation parameters of the address of the transmitter element a, reconstituted by the address translation memory. The transmitter element does not have means for storing the address computation signals or means for effecting the address computation. The addresses of the source or sources whose image is formed on the receiver element B are delivered directly.

We claim:

1. A device for switching optically modulated signals conveyed by at least one link of N input links towards at least one link of P output links, where N and P are integers greater than one which may be the same or different, comprising:
   a transmit board including N optical sources each associated with a designated input link for delivering an optical signal reproducing the modulations of the signal delivered by said input link,
   a receive board including P optical receivers, each associated with a designated output link for supplying the output link a signal reproducing the modulations of optical flux incident thereon,
   optical means for projecting the image of the transmit board on each optical receiver,
   each of said receivers comprising (a) an array of at least N optical receptor cells having positions respectively conjugated with the positions of the optical sources of the transmit board by means of the optical projection means and (b) switching means for selectively transmitting to the output link associated with said optical receiver signals delivered by each of said receptor cells,
   the transmit board including at least one supplemental reference optical source,
   each optical receiver of the receive board being coupled to a supplemental reference receptor cell exposed to optical flux from said reference source,
   the receive board including means for adjusting at least one of (a) the position of each optical receiver and (b) the position of the optical projection means in such a manner that the reference cell coupled with the said optical receiver derives a signal of optimum level.

2. The device of claim 1 wherein:
   the transmit board further comprises at least one supplemental functional optical source for deriving signals representing pairs of addresses, each signal representing a pair of addresses of link receivers in the receive board,
   each link receiver being associated with a functional receptor cell disposed relative to the link receiver to receive the image of said functional source,
   the switching means including switches for the signals representing a pair of addresses, the switches for the address pair signals of each link receiver comprising switching means for selectively coupling a signal from the addressed link receiver to the output link associated with said link receiver, the address of the link receiver coinciding with the link receiver address of the address pair, the receptor cell or cells of said link receiver receiving the image of the link source having an address coinciding with the link source address of the address pair.

3. The device of claim 1 wherein means for emitting includes the supplementary optical source of the transmit board and signals of address pairs, each address pair containing an address of a link source in said transmit board and an address of a link receiver in the receive board, and the switching means of each link receiver including means for switching to the output link associated with said link receiver, the receptor cell or cells receiving the image of the link source having an address coinciding with the link source address of this address pair in response to the address of the link receiver associated with the output link coinciding with the link receiver address of the address pair optical signal received by the supplementary mosaic of said link receiver.

4. A device for switching modulated signals by optical means intended to switch the modulated signals conveyed by at least one link of N incoming links towards at least one link of P outgoing links, where N and P are integers greater than one which may be the same or different, comprising:
   a transmit board grouping N optical light emitters each of which is associated with a designated incoming link and delivers a light signal reproducing the modulations of the signal delivered by said incoming link,
   a receive board grouping P light receptor cells each of which is associated with a designated outgoing link and delivers to the latter a signal reproducing the modulations of the light flux which it receives,
   optical means for projecting the image of the transmit board on each receptor cell of the receive board,
   each optical emitter of the transmit board including P optical sources having positions respectively conjugated through optical projection means with the positions of the receptor cells of the receive board,
   the receive board including at least one reference optical emitter formed by at least one optical source,
   each optical emitter of the transmit board being coupled to a reference light receiver formed by at least one receptor cell exposed to the optical flux of said reference emitter,
   the transmit board further comprising means for adjusting the position of at least one of (a) each link emitter and (b) the optical projection means in such a manner that the reference receiver associated with said optical emitter delivers a signal having optimum level.

5. A device for switching modulated signals by optical means intended to switch the modulated signals conveyed by at least one link of N incoming links towards at least one link of P outgoing links, where N and P are integers greater than one which may be the same or different, comprising:
   a transmit board grouping N light emitters each of which is associated with a designated incoming link and delivers a light signal reproducing the modulations of the signal delivered by said incoming link, a receive board grouping P light receptor cells each of which is associated with a designated outgoing link and delivers to the latter a signal reproducing the modulations of the light flux which it receives, optical means for projecting the image of the transmit board on each receptor cell of the receive board, each optical emitter of the transmit board including P optical sources being respectively conjugated, through said optical projection means, with the positions of the light receptor cells of the receive board, the transmit board further including a reference optical emitter including at least one reference optical source, the receive board including at least one reference mosaic of supplementary receptor cells, and the reference mosaic receiving, through optical means, a projection of the image of the reference source associated with the reference optical emitter in response to the reference source being activated to emit optical energy, and means for deducing the location of at least one of the receptor cells of said reference mosaic responsive to the image of said reference source.

6. The device of claim 5 further comprising means for deducing, from an address of an optical receptor cell of the receive board and the address of at least on reference receptor cell illuminated by the at least one reference source of the reference optical emitter of the transmit board, the address of the at least one source of the said optical emitter to be switched to the incoming link associated with the optical emitter to establish an optical link between said input link and the output link associated with the optical receptor cell.

7. A device for switching modulated signals by optical means intended to switch the modulated signals conveyed by at least one link of N input links towards at least one link of P output links, where N and P are integers greater than one which may be the same or different, comprising:

a transmit board grouping N optical emitters, each emitter being associated with a designated input link and delivering an optical signal reproducing the modulations of the signal transmitted by said input link, a receive board grouping P light receptor cells, each associated with a designated output link for delivering to the output link a signal reproducing the modulations of the optical flux incident thereon, optical means for projecting the image of the transmit board on each light receptor cell, each optical emitter of the transmit board including a switching means and a number of optical sources substantially greater than P, said optical sources forming a source mosaic having an image projected on the receive board, the optical linear density of said sources being such that the linear density of the images thereof is substantially greater than the linear density of the receptor cells of the receive board;

the transmit board including switching means for each optical emitter, the switching means for each optical emitter switching the input link respectively associated with each optical emitter to at least one of the sources projecting an image on a light receptor cell having a designated location in the receive board.

8. The device of claim 7, wherein:

the receive board further comprises at least one reference optical emitter having at least one reference optical source, each optical emitter of the transmit board including a supplementary light receiver formed by a reference mosiac of receptor cells, optical means for projecting the image of the reference source on to the reference mosaic, the switching means of each optical emitter comprising means for determining the address of at least one source of said optical emitter to which the associated input link is switched from an address of a light receptor cell and from the location in the reference mosaic of the receptor cells on which is formed the image of the reference source.

9. The device of claim 7, wherein:

the transmit board includes a reference optical emitter comprising at least one reference optical source, the receive board further comprises one reference mosaic of supplementary receptor cells and receives through optical means the projection of the image of the reference source of the reference optical emitter when the said source lights up and the said device comprises furthermore means for deducing from the location of the receptor cell or cells of said reference mosaic on which the image of said reference source is formed, a signal expressing the deviation of the position of said transmit board relative to a nominal position.

10. The device of claim 9 further comprising means for deducing from said deviation signal the address of the source or sources of an optical emitter to be switched to the incoming link associated therewith to establish an optical link between said input link and the output link associated with the light receptor cell.

11. An automatic switching unit for a telecommunication system of image transmission signals, comprising at least one device for switching optically modulated signals conveyed by at least one link of N input links towards at least one link of P output links, where N and P are integers greater than one which may be the same or different, said switching device including:

a transmit board including N optical sources each associated with a designated input link for delivering an optical signal reproducing the modulations of the signal delivered by said input link, a receive board including P optical receivers, each associated with a designated output link for supplying the output link a signal reproducing the modulations of optical flux incident thereon, optical means for projecting the image of the transmit board on each optical receiver, each of said receivers comprising (a) an array of optical receptor cells having positions respectively conjugated with the positions of the sources of the transmit board by means of the optical projection means and (b) switching means for selectively transmitting to the output link associated with said optical received signals delivered by each of said receptor cells, the transmit board including at least one supplementary reference optical source, each optical receiver of the receive board being coupled to a supplementary reference receptor cell exposed to optical flux from said reference source, the receive board including means for adjusting at least one of (a) the position of each optical receiver and (b) the position of the optical projection means in such a manner that the reference cell coupled with the said link receiver derives a signal of optimum level.

12. An automatic switching unit for a telecommunication system of image transmission signals, comprising at least one device for switching optically modulated signals conveyed by at least one link of N input links towards at least one link of P output links, where N and P are integers greater than one which may be the same or different, each switching device including:
- a transmit board including N optical sources each associated with a designated input link for delivering an optical signal reproducing the modulations of the signal delivered by said input link,
- a receive board including P optical receivers, each associated with a designated output link for supplying the output link a signal reproducing the modulations of optical flux incident thereon,
- optical means for projecting the image of the transmit board on each optical receiver,
- each of said receivers comprising (a) an array of optical receptor cells having positions respectively conjugated with the positions of the optical sources of the transmit board by means of the optical projection means and (b) switching means for selectively transmitting to the output link associated with said optical receiver signals delivered by each of said receptor cells,
- the transmit board including at least one supplementary reference optical source,
- each optical receiver of the receive board being coupled to a supplementary reference receptor cell exposed to optical flux from said reference source,
- the receive board including means for adjusting at least one of (a) the position of each optical receiver and (b) the position of the optical projection means in such a manner that the reference cell coupled with the said optical receiver derives a signal of optimum level,
- at least one link status monitoring and dialing receiver unit, the receive board of the switching device further comprising at least one supplementary functional optical receiver including an array of receptor cells substantially identical to the arrays of the receptor cells of the optical receivers, the optical means projecting the image of the transmit board, said automatic switching unit further comprising means for cyclically switching the outputs of the receptor cells of the functional receiver to the link status monitoring and dialing receiver unit in such a manner that the link status monitoring and dialing receiver unit (a) monitors one by one, the status of the transmit board sources, and (b) registers the dialing signals which the source derives.

13. A device for switching optically modulated signals conveyed by at least one link of N input links towards at least one link of P output links, where N and P are integers greater than one which may be the same or different, comprising:
- a transmit board including a plurality of optical sources each associated with a designated input link for delivering an optical signal reproducing the modulations of the signal delivered by said input link;
- said transmit board including a plurality of supplemental reference optical sources;
- a receive board including a plurality of optical receivers, each associated with a designated output link for supplying the output link with a signal reproducing the modulations of optical flux incident thereon, said receive board including at least one supplemental reference optical receiver;
- optical means for projecting an image of the transmit board including the supplemental reference optical sources on each optical receiver, whereby the transmit board image is projected on the supplemental reference optical receiver;
- each of said optical receivers including a number of receptor cells substantially greater than N, the receptor cells in each receiver forming a mosaic having a linear density substantially greater than the linear density of the images of the sources of the transmit board on said mosaic, whereby at least one receptor cell in each optical receiver is adapted to be responsive to an optical source at a given address, the given address being dependent on the position of the optical image projecting means;
- switching means in each receiver including means for switching to the output link associated with said optical receiver a signal from the at least one cell responsive to the image of a designated address source of the transmit board;
- said switching means comprising register means for deriving a signal for controlling switching of the at least one cell switched to said designated output link in response to an indication of an address of the receptor cells of the supplementary reference optical receiver activated by the supplementary reference optical sources.

14. An automatic switching unit for a telecommunication system of image transmission signals, comprising at least one device for switching optically modulated signals conveyed by at least one link of N input links towards at least one link of P output links, where N and P are integers greater than one which may be the same or different, each switching device including:
- a transmit board including: a plurality of N data optical emitters each associated with a designated input link for delivering an optical signal reproducing the modulations of the signal delivered by said designated input link, and at least one functional optical emitter associated with a designated tone signal generator for delivering an optical signal representing said tone signal;
- a receive board including: P data optical receptor cells, each associated with a designated output link for supplying the output link with a signal reproducing the modulations of optical flux incident thereon, at least one functional optical receptor cell and at least one control optical emitter having as many control optical sources as the transmit board has data and functional emitters;
- each of said data optical emitters comprising at least one control receptor cell;
- optical means for projecting the image of the transmit board onto each of the data and functional optical receptor cells;
- optical means for projecting the image of the control optical sources of the control optical emitter respectively onto the control receptor cells;
- means for transmitting address and control signals from said transmit board to said receive board through said functional optical emitter and said functional optical receptor cells; and means for transmitting address and control signals from said receive board to said transmit board through said control optical emitter and said control receptor cells.

15. A device for switching optically modulated signals conveyed by at least one link of N input links towards at least one link of P output links, where N and P are integers greater than one which may be the same or different, comprising:

a transmit board including N optical emitters each associated with a designated input link for delivering an optical signal reproducing the modulations of the signal delivered by said input link, a receive board including P optical receptor cells, each associated with a designated output link for supplying the output link a signal reproducing the modulations of optical flux incident thereon, optical means for projecting the image of the transmit board onto each optical receptor cell, each of said N optical emitters comprising an array of at least P optical sources and switching means including means for recognizing an address signal assigned to an optical cell of the receive board and controlling enablement of the addressed optical receptor cell, and means for switching the input link associated with each optical emitter to the optical source or sources of said optical emitter containing the optical means forming the image on the said optical cell, the receive board further comprising at least one control optical emitter and means for transmitting through said control optical emitter the address signal of an optical source in a given optical emitter;

each optical emitter of the transmit board being coupled to a control light receiver including at least one receptor cell exposed to optical flux derived from said control emitter, each receptor cell exposed to optical flux having an output connected to the input of the address recognition means of said optical emitter of the transmit board.

16. The device of claim 15, wherein the transmit board further comprises means for adjusting the position of at least one of (a) each optical emitter and (b) the optical projection means in such a manner that the control receiver associated with said optical emitter derives a signal having optimum level.

* * * * *